(12) United States Patent
Lee et al.

(10) Patent No.: US 11,169,542 B2
(45) Date of Patent: Nov. 9, 2021

(54) MOVING ROBOT

(71) Applicant: LG ELECTRONICS INC., Seoul (KR)

(72) Inventors: Jaehoon Lee, Seoul (KR); Jongjin Woo, Seoul (KR); Kyuchun Choi, Seoul (KR)

(73) Assignee: LG Electronics Inc., Seoul (KR)

(*) Notice: Subject to any disclaimer, the term of this patent is extended or adjusted under 35 U.S.C. 154(b) by 310 days.

(21) Appl. No.: 16/263,562

(22) Filed: Jan. 31, 2019

(65) Prior Publication Data
US 2019/0243386 A1    Aug. 8, 2019

(30) Foreign Application Priority Data
Feb. 2, 2018    (KR) .................. 10-2018-0013428

(51) Int. Cl.
*G05D 1/08*    (2006.01)
*G05D 1/02*    (2020.01)

(52) U.S. Cl.
CPC .......... *G05D 1/0891* (2013.01); *G05D 1/027* (2013.01); *G05D 1/0219* (2013.01); *G05D 1/0259* (2013.01); *G05D 2201/0208* (2013.01)

(58) Field of Classification Search
None
See application file for complete search history.

(56) References Cited

U.S. PATENT DOCUMENTS

| | | | | |
|---|---|---|---|---|
| 6,076,025 A * | 6/2000 | Ueno | ................... | G05D 1/0219 |
| | | | | 701/23 |
| 9,471,063 B2 * | 10/2016 | Ouyang | .............. | A01D 34/008 |
| 2003/0025472 A1 * | 2/2003 | Jones | ................... | G05D 1/0227 |
| | | | | 318/568.12 |
| 2005/0166355 A1 * | 8/2005 | Tani | ...................... | A47L 9/2852 |
| | | | | 15/319 |

(Continued)

FOREIGN PATENT DOCUMENTS

| | | |
|---|---|---|
| CN | 106325276 | 1/2017 |
| EP | 1 475 609 | 11/2004 |

(Continued)

OTHER PUBLICATIONS

Australian Office Action dated Mar. 2, 2020 issued in AU Application No. 2019200667.

(Continued)

*Primary Examiner* — Adam R Mott
*Assistant Examiner* — Tischi Balachandra
(74) *Attorney, Agent, or Firm* — KED & Associates, LLP

(57) ABSTRACT

A moving robot includes: a body defining an exterior; a traveling unit configured to move the body against a travel surface; an operation unit disposed in the body and configured to perform a predetermined operation; a tilt information acquisition sensor configured to acquire tilt information on a tilt of the travel surface; and a controller configured to, when target movement direction being preset irrespective of an inclination of the travel surface crosses an upward inclination direction of the travel surface, control a heading (Continued)

direction, which is a direction of a traveling force (Fh) preset to be applied by the traveling unit to the body, to be a direction between the target movement direction and the upward inclination direction based on the tilt information.

20 Claims, 14 Drawing Sheets

(56) References Cited

U.S. PATENT DOCUMENTS

| | | | | |
|---|---|---|---|---|
| 2005/0251292 | A1* | 11/2005 | Casey | G05D 1/0242 700/245 |
| 2007/0213892 | A1* | 9/2007 | Jones | G05D 1/0227 701/23 |
| 2007/0285041 | A1* | 12/2007 | Jones | G05D 1/0227 318/568.12 |
| 2008/0039974 | A1* | 2/2008 | Sandin | B60L 50/52 700/258 |
| 2008/0290618 | A1* | 11/2008 | Yanaka | B60G 17/0195 280/6.15 |
| 2011/0118928 | A1* | 5/2011 | Yoo | A47L 9/2852 701/26 |
| 2012/0232738 | A1* | 9/2012 | Jeon | A47L 9/009 701/25 |
| 2012/0323420 | A1* | 12/2012 | Koike | B62D 6/04 701/22 |
| 2013/0025957 | A1* | 1/2013 | Ellsworth | A01D 34/64 180/210 |
| 2013/0041549 | A1* | 2/2013 | Reeve | G05D 1/0278 701/28 |
| 2013/0098402 | A1* | 4/2013 | Yoon | G05D 1/0219 134/18 |
| 2014/0012418 | A1* | 1/2014 | Johnson | B25J 9/0003 700/258 |
| 2014/0012453 | A1* | 1/2014 | Johnson | G05D 1/0219 701/23 |
| 2014/0324269 | A1* | 10/2014 | Abramson | G05D 1/0212 701/26 |
| 2016/0374527 | A1* | 12/2016 | Yoo | A47L 11/4061 180/209 |
| 2017/0035263 | A1* | 2/2017 | Kim | A47L 11/4011 |
| 2017/0153641 | A1* | 6/2017 | Serizawa | G08G 1/16 |
| 2017/0285627 | A1* | 10/2017 | Feldmann | H04W 4/025 |
| 2017/0315554 | A1* | 11/2017 | Lee | G05D 1/0219 |
| 2017/0315560 | A1* | 11/2017 | Sun | A01D 34/008 |
| 2017/0342733 | A1* | 11/2017 | Korenfeld | C02F 1/001 |
| 2017/0357266 | A1* | 12/2017 | Yu | A47L 11/24 |
| 2017/0362845 | A1* | 12/2017 | Korenfeld | E04H 4/1654 |
| 2018/0181133 | A1* | 6/2018 | Zhang | G05D 1/0248 |
| 2018/0194411 | A1* | 7/2018 | Liivik | B62D 61/10 |
| 2018/0244327 | A1* | 8/2018 | Liivik | B60G 5/00 |
| 2018/0368642 | A1* | 12/2018 | Son | A47L 9/28 |
| 2019/0142234 | A1* | 5/2019 | Yoon | G05D 1/0238 701/23 |
| 2019/0144116 | A1* | 5/2019 | Yuan | B64C 39/024 701/3 |
| 2019/0227538 | A1* | 7/2019 | Lassini | G06F 11/3013 |
| 2019/0227548 | A1* | 7/2019 | Lassini | G08G 5/0069 |
| 2019/0228666 | A1* | 7/2019 | Lassini | G05D 1/0088 |
| 2019/0230793 | A1* | 7/2019 | Lassini | H05K 1/18 |
| 2020/0012291 | A1* | 1/2020 | Peng | B25J 9/1664 |
| 2020/0062386 | A1* | 2/2020 | Zhang | B63B 35/00 |
| 2020/0159245 | A1* | 5/2020 | Raag | G05D 1/0251 |
| 2020/0224441 | A1* | 7/2020 | Witelson | G05D 1/0238 |
| 2020/0333790 | A1* | 10/2020 | Kobayashi | G01S 17/931 |
| 2020/0375095 | A1* | 12/2020 | Koto | G01S 19/14 |

FOREIGN PATENT DOCUMENTS

| | | | | |
|---|---|---|---|---|
| EP | 3 238 523 | | 11/2017 | |
| EP | 3 518 065 | | 7/2019 | |
| JP | 2018000845 | A * | 7/2016 | A63H 11/00 |
| KR | 10-2015-0125508 | | 11/2015 | |
| KR | 10-2016-0128126 | | 11/2016 | |
| WO | WO 2013/104455 | | 7/2013 | |
| WO | WO 2014/129941 | | 8/2014 | |
| WO | WO 2014/145996 | | 9/2014 | |

OTHER PUBLICATIONS

European Search Report dated Jun. 25, 2019 issued in EP Application No. 19154969.0.

Korean Office Action dated Jul. 23, 2019 issued in KR Application No. 10-2018-0013428.

* cited by examiner

FIG. 6
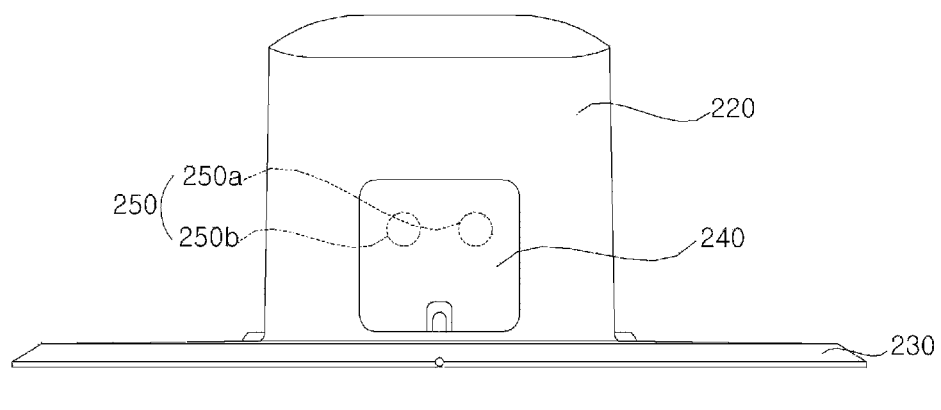
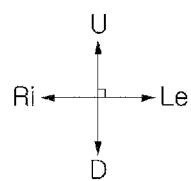

FIG. 13
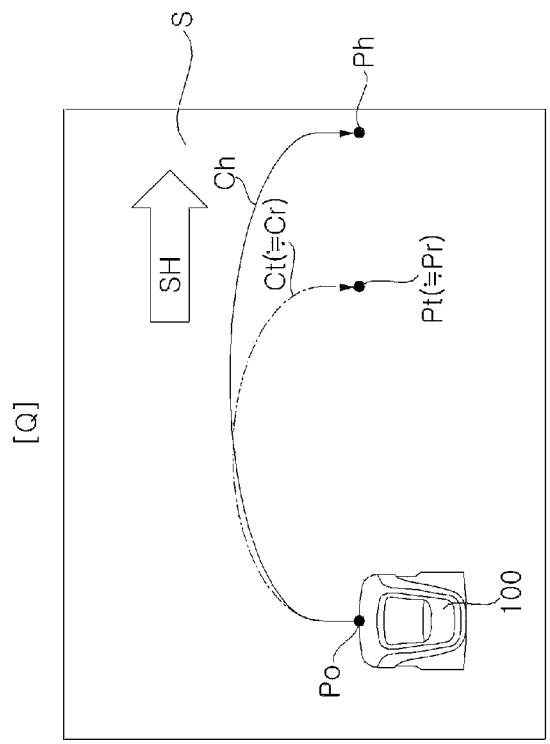
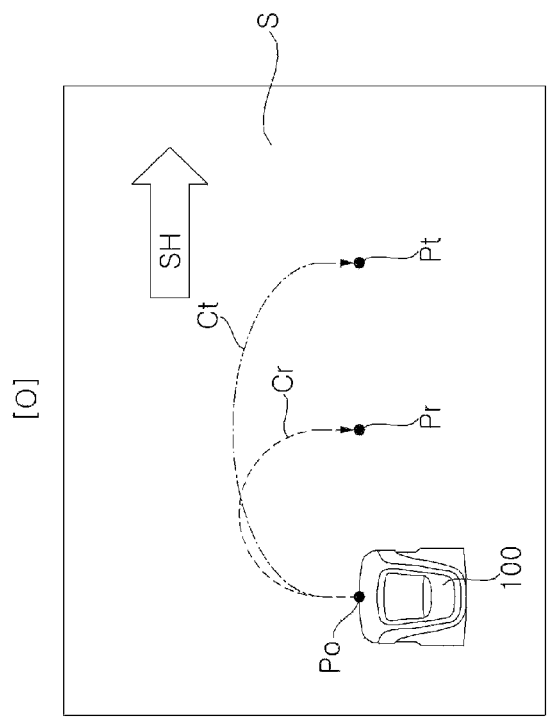

MOVING ROBOT

CROSS-REFERENCE TO RELATED APPLICATION

This application claims priority under 35 U.S.C. § 119 to Korean Application No. 10-2018-0013428 filed on Feb. 2, 2018, whose entire disclosure is hereby incorporated by reference.

BACKGROUND

1. Field

The present disclosure relates to controlling travel of a moving robot.

2. Background

Robots were developed for industrial use and prompted automation of production operations. Recently, they are being used more widely, for example, in the medical industry and the aerospace industry. There are even domestic robots used for household chores. Among such robots, a type of robot capable of traveling on it own is called a moving robot. A typical example of a moving robot used for a home's outdoor environment is a lawn mower robot.

For a moving robot traveling in an indoor space, an movable area is restricted by a wall or furniture, and, for a moving robot traveling an outdoor space, it is necessary to set a movable area in advance. In addition, a movable area needs to be limited to allow the lawn mower robot to travel on a grass area.

In an existing technology described in Korean Patent Application Publication No. 2015-0125508 (published on Nov. 9, 2015), a wire for setting an area to be traveled by a lawn mower robot may be installed in the lawn mower robot, and the lawn mower robot may sense a magnetic field formed by currents flowing by the wire and move in an area set by the wire. The above reference is incorporated by reference herein where appropriate for appropriate teachings of additional or alternative details, features and/or technical background.

In addition, a moving robot autonomously traveling in an indoor place usually moves on a horizontal travel surface, but a moving robot autonomously traveling in an outdoor place travels not just a horizontal surface but an inclined surface.

BRIEF DESCRIPTION OF THE DRAWINGS

The embodiments will be described in detail with reference to the following drawings in which like reference numerals refer to like elements wherein:

FIG. 6 is a front view of a docking device shown in FIG. 5;

FIG. 13 are zoomed-in views of a portion E1 in FIG. 12 showing a plan conceptual diagram illustrating a target rotational route Ct, an actual rotational route Cr, and a virtual rotational route Ch when the moving robot rotationally moves on the inclined travel surface S and comparing the case O where rotational movement compensation is not performed and the case Q where rotational movement compensation is performed.

DETAILED DESCRIPTION

Figure 1:
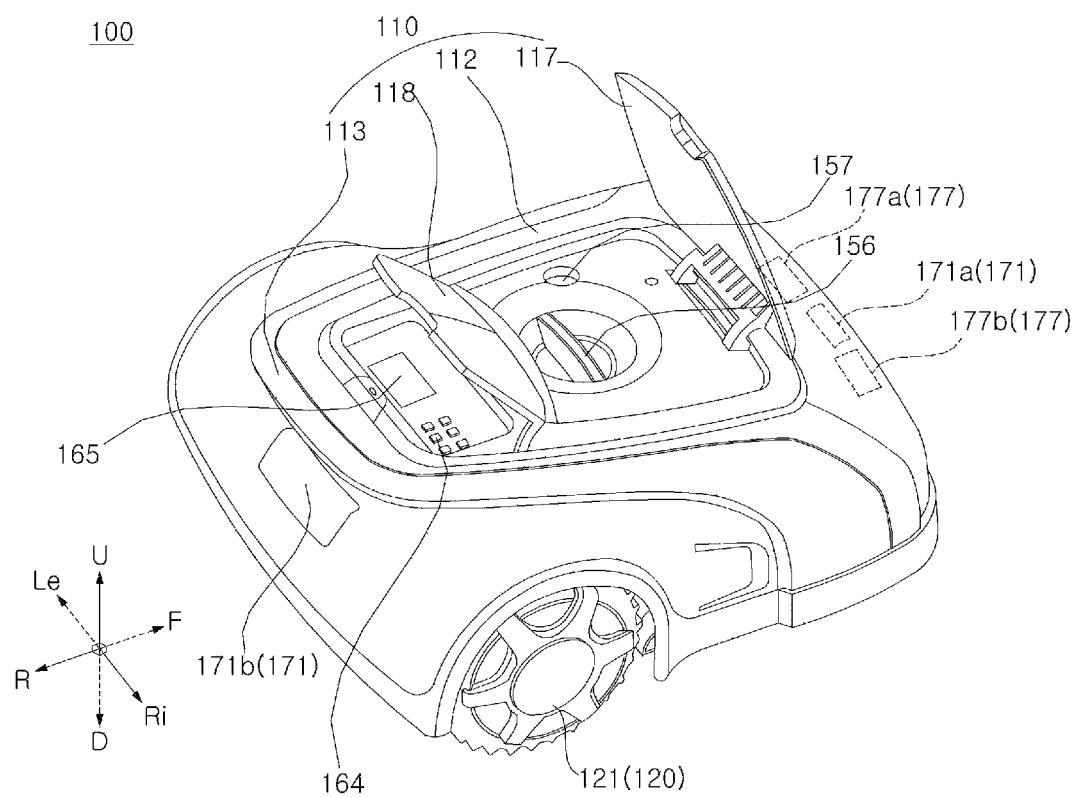
FIG. 1 is a perspective view of a moving robot according to an embodiment the present disclosure.
Figure 2:
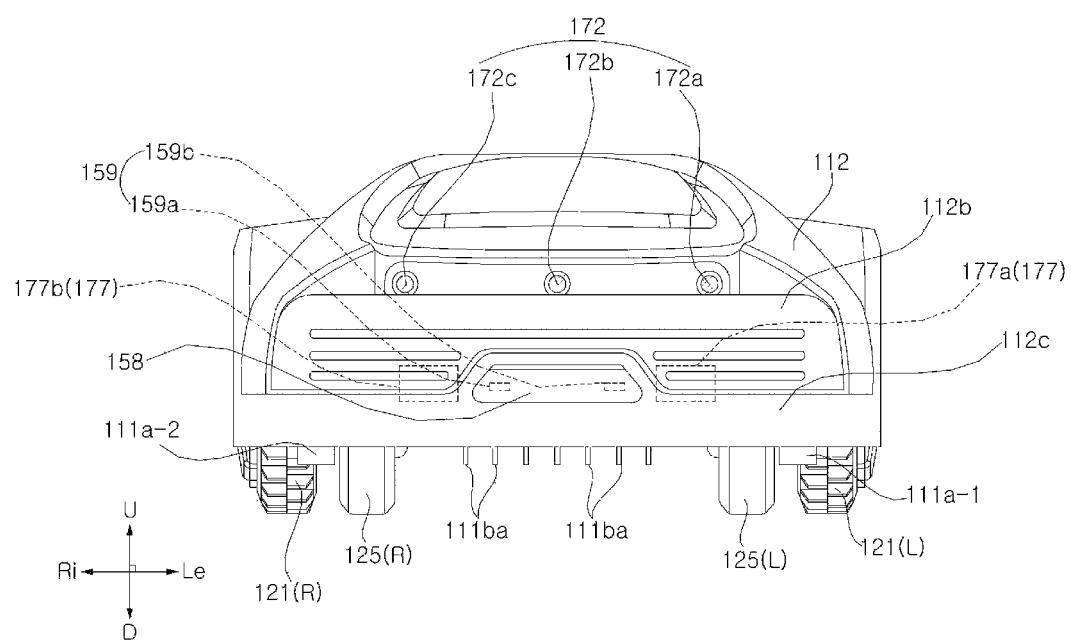
FIG. 2 is a front view of the moving robot of FIG. 1.
Figure 3:
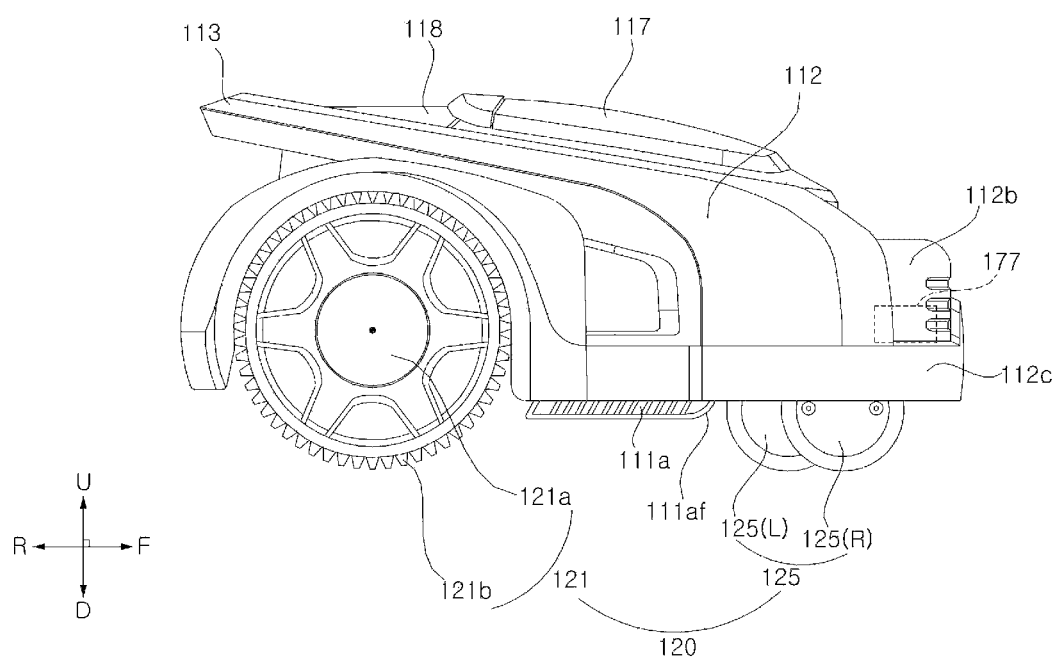
FIG. 3 is a right side view of the moving robot shown in FIG. 1.
Figure 4:
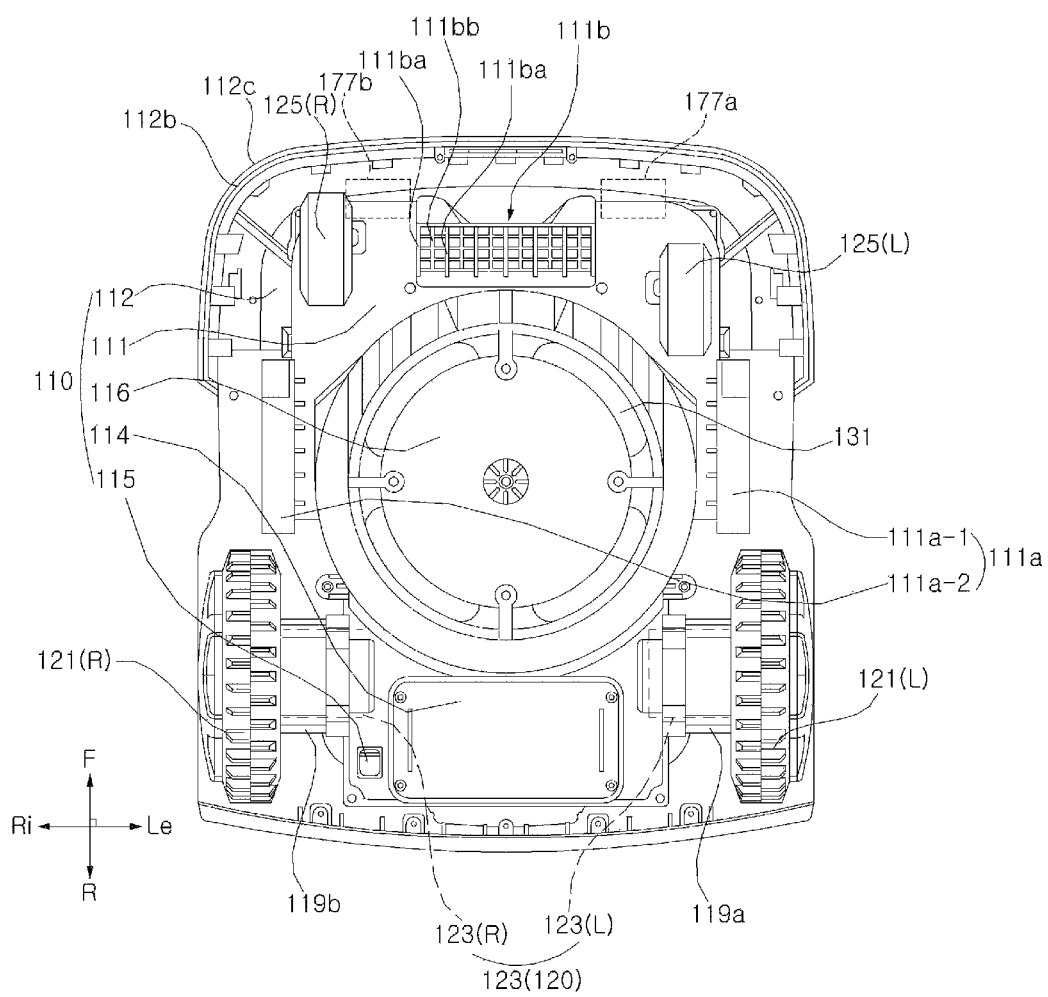
FIG. 4 is a bottom view of the moving robot shown in FIG. 1.

The terms "forward (F)/rearward (R)/upward (U)/downward (D)/indoor (I)/outdoor (O)" mentioned in the following description are defined as shown in the drawings. However, the terms are used merely to clearly understand the present disclosure, and therefore the above-mentioned directions may be differently defined. Furthermore, the terms "first", "second" etc. are used to distinguish elements, and not related to a sequence, importance levels, or a master-servant relationship of elements. For example, only a second element may be included without a first element.

Hereinafter, a moving robot is described as a lawn mower 100 with reference to FIGS. 1 to 6, but the present disclosure is not necessarily limited thereto. With reference to FIGS. 1 to 4, a moving robot 100 includes a body 110 that defines an exterior of the moving robot 100. The body 110 forms an inner space. The moving robot 100 includes a traveling unit 120 that moves the body 110 against a travel surface. The moving robot 100 includes an operation unit 130 that performs a predetermined operation.

The body 110 includes a frame 111 to which a driving motor module 123, which will be described later, is fixed. A blade motor 132, which will be described later, is fixed to the frame 111. The frame 111 supports a battery which will be described later. The frame 111 provides a structure which supports even other components which are not mentioned herein. The frame 111 is supported by an auxiliary wheel 125 and a driving wheel 121.

The body 110 includes a lateral blocking part 111a which prevent a user's finger from entering a blade 131 from a side of the blade 131. The lateral blocking part 111a is fixed to the frame 111. The lateral blocking part 111a is projected downward, compared to a button surface of another part of the frame 111. The lateral blocking part 111a is arranged to cover an upper side of a space between the driving wheel 121 and the auxiliary wheel 125.

A pair of lateral blocking parts 111a-1 and 111a-2 is arranged on the left and right sides to the blade 131. The lateral blocking part 111a is spaced a predetermined distance apart from the blade 131. A front surface 111af of the lateral blocking part 111a is formed in a round shape. The front surface 111af forms a surface that is bent in a round manner upwardly in a forward direction from a bottom surface of the lateral blocking part 111a. By use of the shape of the front surface 111af, the lateral blocking parts 111a is able to easily go over an obstacle of a predetermined height or lower thereunder when the moving robot 100 moves forward.

The body 110 includes a front blocking part 111b which prevents a user's finger from entering between the blade 131 from the front of the blade 131. The front blocking part 111b is fixed to the frame 111. The front blocking part 111b is arranged to partially cover an upper side of a space between a pair of auxiliary wheels 125(L) and 125(R).

The front blocking part 111b includes a projected rib 111ba which is projected downward compared to a bottom surface of another part of the frame 111. The projected rib 111ba extends in a front-rear direction. An upper portion of the projected rib 111ba is fixed to the frame 111, and a lower portion of the projected rib 111ba forms a free end.

A plurality of projected ribs 111ba may be spaced apart leftward and rightward from each other. The plurality of projected ribs 111ba may be arranged in parallel to each other. A gap is formed between two adjacent projected ribs 111ba. A front surface of the projected ribs 111ba is formed in a round shape. The front surface of the projected rib 111ba forms a surface that is bent in a round manner upwardly in a forward direction from a bottom surface of the projected rib 111ba. By use of the shape of the front surface of the projected rib 111ba, the projected rib 111ba is able to easily go over an obstacle of a predetermined height or lower thereunder when the moving robot 100 moves forward.

The front blocking part 111b includes an auxiliary rib 111bb which reinforces rigidity. The auxiliary ribs 111bb for reinforcing rigidity of the front blocking part 111b is arranged between upper portions of two adjacent projected ribs 111ba. The auxiliary rib 111bb may be projected downward and may be in a lattice shape which extends.

In the frame 111, a caster which supports the auxiliary wheel 125 rotatably is arranged. The caster is arranged rotatable with respect to the frame 111. The caster is disposed rotatable about a vertical axis. The caster is disposed in a lower side of the frame 111. The caster is provided as a pair of casters corresponding to the pair of auxiliary wheels 125.

The body 110 includes a case 112 which covers the frame 111 from above. The case 112 defines a top surface and front/rear/left/right surfaces of the moving robot 100. The body 110 may include a case connection part (not shown) which fixes the case 112 to the frame 111. An upper portion of the case connection part may be fixed to the case 112. The case connection part may be arranged movable with respect to the frame 111. The case connection part may be arranged movable only upwardly and downwardly with the frame 111. The case connection part may be provided movable in a predetermined range. The case connection part moves integrally with the case 112. Accordingly, the case 112 is movable with respect to the frame 111.

The body 110 includes a bumper 112b which is disposed at the front. The bumper 112b absorbs an impact upon collision with an external obstacle. At a front surface of the bumper 112b, a bumper groove recessed rearward and elongated in a left-right direction may be formed. The bumper groove may be provided as a plurality of bumper grooves spaced apart from each other in an upward-downward direction. A lower end of the projected rib 111ba is positioned lower than a lower end of the auxiliary rib 111bb.

The front surface and the left and right surfaces of the bumper 112b are connected. The front surface and the left and right surfaces of the bumper 112b are connected in a round manner.

The body 110 may include an auxiliary bumper 112c which is disposed embracing an exterior surface of the bumper 112b. The auxiliary bumper 112c is coupled to the bumper 112b. The auxiliary bumper 112c embraces lower portions of the front, left, and right surfaces of the bumper 112b. The auxiliary bumper 112c may cover the lower half portions of the front, left, and right surfaces of the bumper 112b.

The front surface of the auxiliary bumper 112c is disposed ahead of the front surface of the bumper 112b. The auxiliary bumper 112c forms a surface projected from a surface of the bumper 112b. The auxiliary bumper 112c may be formed of a material which is advantageous in absorbing impact, such as rubber. The auxiliary bumper 112c may be formed of a flexible material.

The frame 111 may be provided with a movable fixing part (not shown) to which the bumper 112b is fixed. The movable fixing part may be projected upward of the frame 111. The bumper 112b may be fixed to an upper portion of the movable fixing part.

The bumper 112b may be disposed movable in a predetermined range with the frame 111. The bumper 112b may be fixed to the movable fixing part and thus movable integrally with the movable fixing part. The movable fixing part may be disposed movable with respect to the frame 111. The movable fixing part may be rotatable about a virtual rotation axis in a predetermined range with the frame 111. Accordingly, the bumper 112b may be movable integrally with the movable fixing part with respect to the frame 111.

The body 110 includes a handle 113. The handle 113 may be disposed at the rear of the case 112. The body 110 includes a battery slot 114 which a battery is able to be inserted into and separated from. The battery slot 114 may be disposed at a bottom surface of the frame 111. The battery slot 114 may be disposed at the rear of the frame 111.

The body 110 includes a power switch 115 to turn on/off power of the moving robot 100. The power switch 115 may be disposed at the bottom surface of the frame 111. The body 110 includes a blade protector 116 which hides the lower side of the central portion of the blade 131. The blade protector 116 is provided to expose centrifugal portions of blades of the blade 131 while hiding the central portion of the blade 131.

The body 110 includes a first opening and closing door 117 which opens a portion in which a height adjuster 156 and a height indicator 157 are arranged. The first opening and closing door 117 is hinge-coupled to the case 112 to be opened and closed. The first opening and closing door 117 is arranged in a top surface of the case 112. The first opening and closing door 117 is formed in a plate shape, and, when closed, covers the top of the height adjuster 156 and the height indicator.

The body 110 includes a second opening and closing door 118 which opens and closes a portion in which a display module 165 and an input unit 164 is arranged. The second opening and closing door 118 is hinge-coupled to the case 112 to be opened and closed. The second opening and closing door 118 is arranged in a top surface of the case 112. The second opening and closing door 118 is disposed behind the first opening and closing door 117. The second opening and closing door 118 is formed in a plate shape, and, when closed, covers the display module 165 and the input unit 164.

An available opening angle of the second opening and closing door 118 is predetermined to be smaller than an available opening angle of the first opening and closing door 117. In doing this, even when the second opening and closing door 118 is opened, a user is allowed to easily open the first opening and closing door 117 and easily manipulate the height adjuster 156. In addition, even when the second opening and closing door 118 is opened, the user is allowed to visually check content of the height display 157. For example, the available opening angle of the first opening and closing door 117 may be about 80 to 90 degrees with reference to the closed state of the first opening 117. For example, the available opening angle of the second opening and closing door 118 may be about 45 to 60 degrees with reference to the closed state of the second opening and closing door 118.

A rear of the first opening and closing door 117 is lifted upward from a front thereof to thereby open the first opening and closing door 117, and a rear of the second opening and closing door 118 is lifted upward from a front thereof to thereby open the second opening and closing door 118. In doing so, even while the lawn mower 100 moves forward, a user located in an area behind the lawn mower 100, which is a safe area, is able to open and close the first opening and closing door 117 and the second opening and closing door 118. In addition, in doing so, opening of the first opening and closing door 117 and opening of the second opening and closing door 118 may be prevented from intervening each other.

The first opening and closing door 117 may be rotatable with respect to the case 112 about a rotation axis which extends from the front of the first opening and closing door 117 in a left-right direction. The second opening and closing door 118 may be rotatable with respect to the case 112 about a rotation axis which extends from the front of the second opening and closing door 118 in the left-right direction.

The body 110 may include a first motor housing 119*a* which accommodates a first driving motor 123(L), and a second motor housing 119*b* which accommodates a second driving motor 123(R). The first motor housing 119*a* may be fixed to the left side of the frame 111, and the second motor housing 119*b* may be fixed to the right side of the frame 111. A right end of the first motor housing 119*a* is fixed to the frame 111. A left end of the second motor housing 119*b* is fixed to the frame 111.

The first motor housing 119*a* is formed in a cylindrical shape that defines a height in the left-right direction. The second motor housing 119*b* is formed in a cylindrical shape that defines a height in the left-right direction.

The traveling unit 120 includes the driving wheel 121 that rotates by a driving force generated by the driving motor module 123. The traveling unit 120 may include at least one pair of driving wheels 121 which rotate by a driving force generated by the driving motor module 123. The driving wheel 121 may include a first wheel 121(L) and a second wheel 121(R), which are provided on the left and right sides and rotatable independently of each other. The first wheel 121(L) is arranged on the left side, and the second wheel 121(R) is arranged on the right side. The first wheel 121(L) and the second wheel 121(R) are spaced apart leftward and rightward from each other. The first wheel 121(L) and the second wheel 121(R) are arranged in a lower side at the rear of the body 110.

The first wheel 121(L) and the second wheel 121(R) are rotatable independently of each other so that the body 110 is rotatable and forward movable relative to a ground surface. For example, when the first wheel 121(L) and the second wheel 121(R) rotate at the same speed, the body 110 is forward movable relative to the ground surface. For example, when a rotation speed of the first wheel 121(L) is faster than a rotation speed of the second wheel 121(R) or when a rotation direction of the first wheel 121(L) and a rotation direction of the second wheel 121(R) are different from each other, the body 110 is rotatable against the ground surface.

The first wheel 121(L) and the second wheel 121(R) may be formed to be greater than the auxiliary wheel 125. A shaft of the first driving motor 123(L) may be fixed to the center of the first wheel 121(L), and a shaft of the second driving motor 123(R) may be fixed to the center of the second wheel 121(R).

The driving wheel 121 includes a wheel circumference part 121*b* which contacts the ground surface. For example, the wheel circumference part 121*b* may be a tire. In the wheel circumference part 121*b*, a plurality of projections for increasing a frictional force with the ground surface may be formed.

The driving wheel 121 may include a wheel fame (not shown), which fixes the wheel circumference part 121*b* and receives a driving force for the motor 123. A shaft of the motor 123 is fixed to the center of the wheel frame to receive a rotation force. The wheel circumference part 121*b* is arranged surrounding a circumference of the wheel frame.

The driving wheel 121 includes a wheel cover 121*a* which covers an exterior surface of the wheel frame. With reference to the wheel frame, the wheel cover 121*a* is arranged in a direction opposite to a direction in which the motor 123 is arranged. The wheel cover 121*a* is arranged at the center of the wheel circumference part 121*b*.

The traveling unit 120 includes the driving motor module 123 which generates a driving force. The traveling unit 120 includes the driving motor module 123 which provides a driving force for the driving wheel 121. The driving motor module 123 includes the first driving motor 123(L) which provides a driving force for the first wheel 121(L), and the second driving motor 123(R) which provides a driving force for the second wheel 121(R). The first driving motor 123(L) and the second driving motor 123(R) may be spaced apart leftward and rightward from each other. The first driving motor 123(L) may be disposed on the left side of the second driving motor 123(R)

The first driving motor 123(L) and the second driving motor 123(R) may be arranged at a lower side of the body 110. The first driving motor 123(L) and the second driving motor 123(R) may be arranged at the rear of the body 110. The first driving motor 123(L) may be arranged on the right side of the first wheel 121(L), and the second driving motor 123(R) is arranged on the left side of the second wheel 121(R). The first driving motor 123(L) and the second driving motor 123(R) are fixed to the body 110.

The first driving motor 123(L) may be arranged inside the first motor housing 119a, with a motor shaft being projected leftward. The second driving motor 123(R) may be arranged inside the second motor housing 119b, with a motor shaft being projected rightward.

In this embodiment, the first wheel 121(L) and the second wheel 121(R) may be connected to a rotation shaft of the first driving motor 123(L) and a rotation shaft of the second driving motor 123(R), respectively. Alternatively, a component of a shaft or the like may be connected to the first wheel 121(L) and the second wheel 121(R). Alternatively, a rotation force of the motor 123(L) or 123(R) may be transferred to the wheel 121a or 121b by a gear or a chain.

The traveling unit 120 may include the auxiliary wheel 135 which supports the body 110 together with the driving wheel 121. The auxiliary wheel 125 may be disposed ahead of the blade 131. The auxiliary wheel 125 is a wheel which does not receives a driving force generated by a motor, and the auxiliary wheel 125 auxiliarily supports the body 110 against the ground surface. The caster supporting a rotation shaft of the auxiliary wheel 125 is coupled to the frame 111 to be rotatable about a vertical axis. There may be provided a first auxiliary wheel 125(L) arranged on the left side, and a second auxiliary wheel 125(R) arranged on the right side.

The operation unit 130 is provided to perform a predetermined operation. The operation unit 120 is arranged at the body 110. In one example, the operation unit 130 may be provided to perform an operation such as cleaning or lawn mowing. In another example, the operation unit 130 may be provided to perform an operation such as transferring an object or finding an object. In yet another embodiment, the operation unit 130 may perform a security function such as sensing an intruder or a dangerous situation in the surroundings. In this embodiment, the operation unit 130 is described as moving lawn, but there may be various types of operation performed by the operation unit 120 and not limited to this embodiment.

In a robotic lawn mower, the operation unit 130 may include the blade 131 which are rotatably provided to mow lawn. The operation unit 130 may include a blade motor 132 which provides a rotation force for the blade 131.

The blade 131 is arranged between the driving wheel 121 and the auxiliary wheel 125. The blade 131 is arranged on a lower side of the body 110. The blade 131 is exposed from the lower side of the body 110. The blade 131 mows lawn by rotating about a rotation shaft which extends in an upward-downward direction.

A blade motor 132 may be arranged ahead of the first wheel 121(L) and the second wheel 121(R). The blade motor 132 is disposed in a lower side of the center in the inner space of the body 110.

The blade motor 132 may be disposed at the rear of the auxiliary wheel 125. The blade motor 132 may be arranged in a lower side of the body 110. A rotational force of the motor axis is transferred to the blade 131 using a structure such as a gear.

The moving robot 100 includes a battery (not shown) which provides power for the driving motor module 123. The battery provides power to the first driving motor 123(L). The battery provides power for the second driving motor 123(R). The battery may provide power for the blade motor 132. The battery may provide power for a controller 190, an azimuth angle sensor 176, and an output unit 165. The battery may be arranged in a lower side of the rear in the indoor space of the body 110.

The moving robot 100 is able to change a height of the blade 131 from the ground, and change a lawn cutting height. The moving robot 100 includes the height adjuster 156 by which a user is able to change a height of the blade 131. The height adjuster 156 may include a rotatable dial and may change the height of the blade 131 by rotating the dial.

The moving robot 100 includes the height indicator 157 which displays a degree of the height of the blade 131. When the height of the blade 131 is changed upon manipulation of the height adjuster 156, the height displayed by the height display 157 is also changed. For example, the height display 157 may display a height value of grass that is expected after the moving robot 100 mows lawn with the current height of the blade 131.

The moving robot 100 includes a docking insertion part 158 which is connected to a docking device 200 when the moving robot 100 is docked to the docking device 200. The docking insertion part 158 is recessed such that a docking connection part 210 of the docking device 200 is inserted into the docking insertion part 158. The docking insertion part 158 is arranged in the front surface of the body 110. Due to connection of the docking insertion part 158 and the docking connection part 210, the moving robot 100 may be guided to a correct position upon a need of charge.

The moving robot 100 may include a charging counterpart terminal 159 which is disposed at a position to be in contact with a charging terminal 211, which will be described later, when the docking connection part 210 is inserted into the docking insertion part 158. The charging counterpart terminal 159 includes a pair of charging counterpart terminals which are disposed at positions corresponding to a pair of charging terminals 211a and 211b. The pair of charging counterpart terminals 159a and 159b may be disposed on the left and right sides of the docking insertion part 158.

A terminal cover (not shown) for openably/closably covering the pair of charging terminals 211a and 211b may be provided. While the moving robot 100 travels, the terminal cover may cover the docking insertion part 158 and the pair of charging terminals 211a and 211b. When the moving robot 100 is connected with the docking device 200, the terminal cover may be opened, and therefore, the docking insertion part 158 and the pair of charging terminals 211a and 211b may be exposed.

Figure 5:
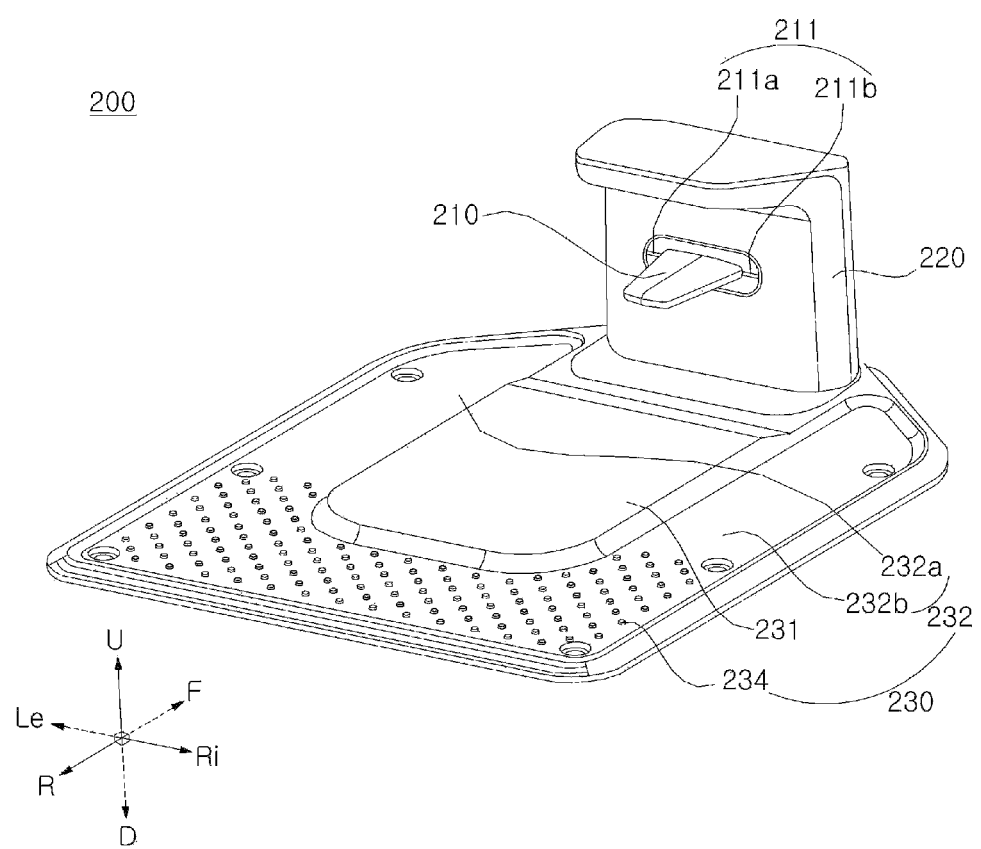
FIG. 5 is a perspective view of a docking device for docking the moving robot shown in FIG. 1.

Meanwhile, referring to FIGS. 5 to 6, the docking device 200 includes a docking base 230 disposed at a floor, and a docking support 220 projected upwardly from the front of the docking base 230. The docking device 200 includes the docking connection part 210 which is inserted into the docking insertion part 158 to charge the moving robot 100. The docking connection part 210 may be projected rearward of the docking support 220.

The docking connection part 210 may be formed to have a vertical thickness smaller than a horizontal thickness. A horizontal width of the docking connection part 210 may be narrowed toward the rear. As viewed from above, the docking connection part 210 is broadly in a trapezoidal shape. The docking connection part 210 is vertically symmetrical. The rear of the docking connection part 210 forms a free end, and the front of the docking connection part 210 is fixed to the docking support 220. The rear of the docking connection part 210 may be formed in a round shape. When the docking connection part 210 is fully inserted into the docking insertion part 158, charging of the moving robot 100 by the docking device 200 may be performed.

The docking device 200 includes the charging terminal 211 to charge the moving robot 100. As the charging terminal 211 and the charging counterpart terminal 159 of the moving robot 100 are brought into contact with each other, charging power may be supplied from the docking device 200 to the moving robot 100.

The charging terminal 211 includes a contact surface facing rearward, and the charging counterpart terminal 159 includes a contact counterpart surface facing forward. As the contact surface of the charging terminal 211 is brought into contact with the contact counterpart surface of the charging counterpart terminal 159, power of the docking device 200 is connected with the moving robot 100.

The charging terminal 211 may include a pair of charging terminals 211a and 211 b which form a positive polarity (+) and a negative polarity (−), respectively. The first charging terminal 211a is provided to come into contact with the first charging counterpart terminal 159a, and the second charging terminal 211b is provided to come into contact with the second charging counterpart terminal 159b.

The pair of charging terminals 211a and 211b may be arranged with the docking connection part 210 therebetween. The pair of charging terminals 211a and 2111b may be arranged on the left and right sides of the docking connection part 210.

The docking base 230 includes a wheel guard 232 on which the driving wheel 121 and the auxiliary wheel 125 of the moving robot 100 are to be positioned. The wheel guard 232 includes a first wheel guard 232a which guides movement of the first auxiliary wheel 125(L), and a second wheel guard 232b which guides movement of the second auxiliary wheel 125(R). Between the first wheel guard 232a and the second wheel guard 232b, there is a central base 231 which is convex upwardly. The docking base 230 includes a slip prevention part 234 to prevent slipping of the first wheel 121(L) and the second wheel 121(R). The slip prevention part 234 may include a plurality of projections which are projected upwardly.

Meanwhile, a wire 290 for setting a border of a travel area of the moving root 100 may be provided. The wire 290 may generate a predetermined border signal. By detecting the border signal, the moving robot 100 is able to recognize the border of the travel area set by the wire 290.

For example, as a predetermined current is allowed to flow along the wire 290, a magnetic field may be generated around the wire 290. The generated magnetic field is the aforementioned border signal. As an alternating current with a predetermined pattern of change are allowed to flow in the wire 290, a magnetic field generated around the wire 290 may change in the predetermined pattern of change. Using a border signal detector (or border signal sensor) 177 for detecting a magnetic field, the moving robot 100 may recognize that the moving robot 100 has approached the wire 290 within a predetermined distance, and accordingly, the moving robot 100 may travel only in a travel area within a border set by the wire 290.

The docking unit 200 may play a role of transferring a predetermined current to the wire 290. The docking device 200 may include a wire terminal 250 connected to the wire 290. Both ends of the wire 290 may be connected to a first wire terminal 250a and a second wire terminal 250b. Through the connection between the wire 290 and the wire terminal 250, a power supply of the docking device 200 may supply a current to the wire 290.

The wire terminal 250 may be disposed at the front (F) of the docking device 200. That is, the wire terminal 250 may be disposed at a position opposite to a direction in which the docking connection part 210 is projected. The wire terminal 250 may be disposed in the docking support 220. The first wire terminal 250a and the second wire terminal 250b may be spaced apart leftward and rightward from each other.

The docking device 200 may include a wire terminal opening and closing door 240 which openably/closably covers the wire terminal 250. The wire terminal opening and closing door 240 may be disposed at the front (F) of the docking support 220. The wire terminal opening and closing door 240 may be hinge-coupled to the docking support 220 to be opened and closed by rotation.

Figure 7:
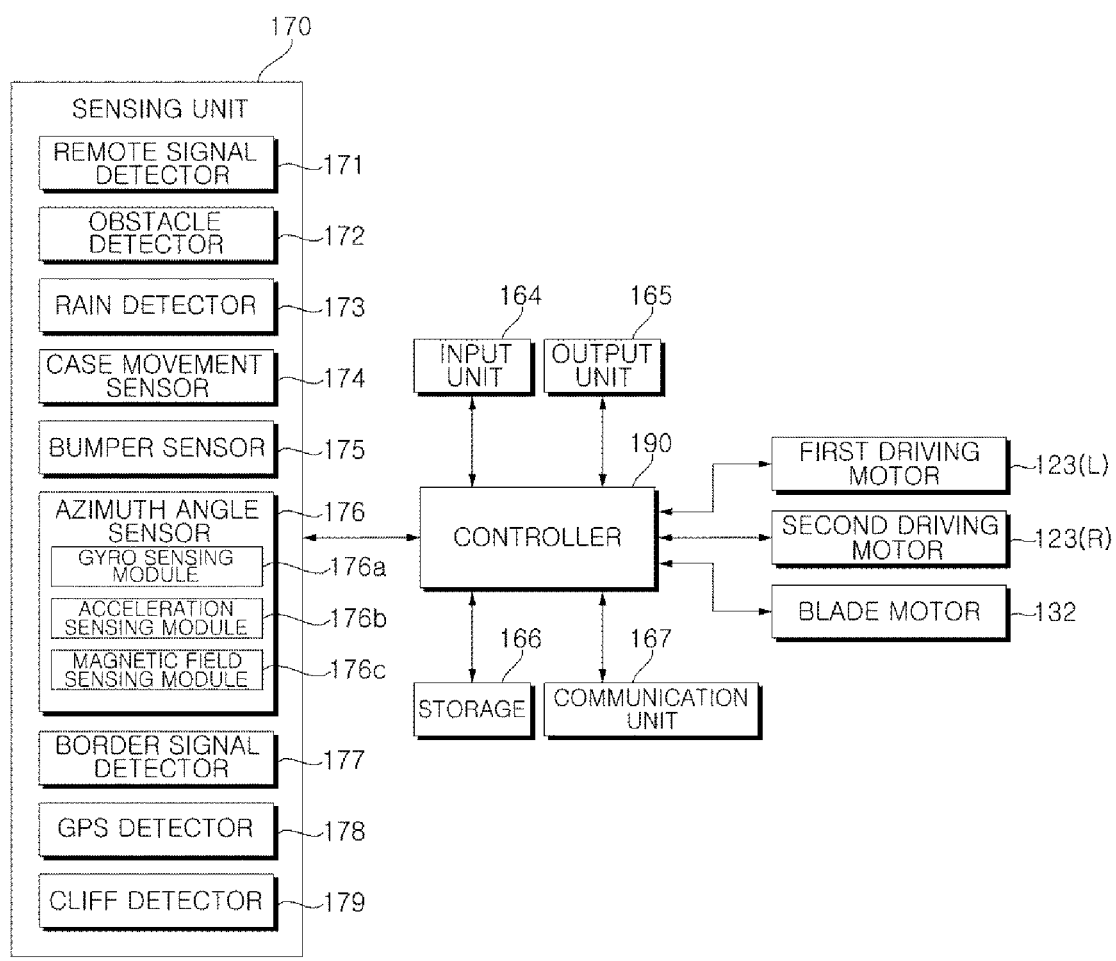
FIG. 7 is a block diagram illustrating a control relation of the moving robot shown in FIG. 1.

Meanwhile, referring to FIG. 7, the moving robot 100 may include the input unit 164 through which various instructions from a user is allowed to be input. The input unit 164 may include a button, a dial, a touch-type display, etc. The input unit 164 may include a microphone to recognize a voice. In this embodiment, a plurality of buttons is arranged in an upper side of the case 112.

The moving robot 100 may include the output unit 165 to output various types of information to a user. The output unit 165 may include a display module which displays visual information. The output unit 165 may include a speaker (not shown) which outputs audible information.

In this embodiment, the display module 165 outputs an image in an upward direction. The display module 165 is arranged in the upper side of the case 112. In one example, the display module 165 may include a thin film transistor Liquid-Crystal Display (LCD). In addition, the display module 165 may be implemented using various display panels such as a plasma display panel, an organic light emitting diode display panel, etc.

The moving robot 100 includes a storage 166 which stores various types of information. The storage 166 stores various types of information necessary to control the moving robot 100, and the storage 166 may include a volatile or non-volatile recording medium. The storage 166 may store information input through the input unit 164 or information received through a communication unit 167. The storage 166 may store a program required to control the moving robot 100.

The moving robot 100 may include the communication unit 167 to communicate with an external device (a terminal and the like), a server, a router, etc. For example, the communication unit 167 may be capable of performing wireless communication with a wireless communication technology such as IEEE 802.11 WLAN, IEEE 802.15 WPAN, UWB, Wi-Fi, Zigbee, Z-wave, Blue-Tooth, etc. The communication unit 167 may differ depending on a target device to communication or a communication method of a server.

The moving robot 100 includes a sensing unit 170 which senses a state of the moving robot 100 or information relating to an environment external to the moving robot 100. The sensing unit 170 may include at least one of a remote signal detector 171, an obstacle detector 172, a rain detector 173, a case movement sensor 174, a bumper sensor 175, an azimuth angle sensor 176, a border signal detector 177, a Global Positioning System (GPS) detector 178, or a cliff detector 179.

The remote signal detector 171 receives an external remote signal. Once a remote signal from an external remote controller is transmitted, the remote signal detector 171 may receive the remote signal. For example, the remote signal may be an infrared signal. The signal received by the remote signal detector 171 may be processed by a controller 190.

A plurality of remote signal detectors 171 may be provided. The plurality of remote signal detectors 171 may include a first remote signal detector 171a disposed at the front of the body 110, and a second remote signal detector 171b disposed at the rear of the body 110. The first remote signal detector 171a receives a remote signal transmitted from the front. The second remote signal detector 171b receives a remote signal transmitted from the rear.

The obstacle detector 172 senses an obstacle around the moving robot 100. The obstacle detector 172 may sense an obstacle in the front. A plurality of obstacle detectors 172a, 172b, and 172c may be provided. The obstacle detector 172 is disposed at a front surface of the body 110. The obstacle detector 172 is disposed higher than the frame 111. The obstacle detector 172 may include an infrared sensor, an ultrasonic sensor, a Radio Frequency (RF) sensor, a geomagnetic sensor, a Position Sensitive Device (PSD) sensor, etc.

The rain detector 173 senses rain when it rains in an environment where the moving robot 100 is placed. The rain detector 173 may be disposed in the case 112.

The case movement sensor 174 senses movement of the case connection part. If the case 112 is lifted upward from the frame 111, the case connection part moves upward and accordingly the case movement sensor 174 senses the lifted state of the case 112. If the case movement sensor 174 senses the lifted state of the case 112, the controller 190 may perform a control action to stop operation of the blade 131. For example, if a user lifts the case 112 or if a considerable-sized obstacle underneath lifts the case 112, the case movement sensor 174 may sense the lift.

The bumper sensor 175 may sense rotation of the movable fixing part. For example, a magnet may be disposed in one side of the bottom of the movable fixing part, and a sensor for sensing a change in a magnetic field of the magnet may be disposed in the frame. When the movable fixing part rotates, the bumper sensor 175 senses a change in the magnetic field of the magnet. Thus, the bumper sensor 175 capable of sensing rotation of the movable fixing part may be implemented. When the bumper 112b collides with an external obstacle, the movable fixing part rotates integrally with the bumper 112b. As the bumper sensor 175 senses the rotation of the movable fixing part, the bumper sensor 175 may sense the collision of the bumper 112b.

The sensing unit 170 includes a tilt information acquisition unit (or tilt sensor) 180 which acquires tilt information on a tilt of a traveling surface (S). By sensing a tilt of the body 110, the tilt information acquisition unit 180 may acquire the tilt information on inclination of the traveling surface (S) on which the body 110 is placed. In one example, the tilt information acquisition unit 180 may include a gyro sensing module 176a. The tilt information acquisition unit 180 may include a processing module (not shown) which converts a sensing signal from the gyro sensing module 176a into the tilt information. The processing module may be implemented as an algorithm or a program which is part of the controller 190. In another example, the tilt information acquisition unit 180 may include a magnetic field sensing module 176c, and acquire the tilt information based on sensing information about the magnetic field of the Earth.

The gyro sensing module 176a may acquire information on a rotational angular speed of the body 110 relative to the horizontal plane. Specifically, the gyro sensing module 176a may sense a rotational angular speed which is parallel to the horizontal plane about the X and Y axes orthogonal to each other. By merging a rotational angular speed (roll) about the X axis and a rotational angular speed (pitch) about the Y axis with the processing module, it is possible to calculate a rotational angular speed relative to the horizontal plane. By integrating the rotational angular speed relative to the horizontal plane, it is possible calculate a tilt value. In one example, the gyro sensing module 176a may sense a predetermined reference direction, and the tilt information acquisition unit 180 may acquire the tilt information based on the reference direction.

The azimuth angle sensor (AHRS) 176 may have a gyro sensing function. The azimuth angle sensor 176 may further include an acceleration sensing function. The azimuth angle sensor 176 may further include a magnetic field sensing function.

The azimuth angle sensor 176 may include a gyro sensing module 176a which performs gyro sensing. The gyro sensing module 176a may sense a horizontal rotational speed of the body 110. The gyro sensing module 176a may sense a tilting speed of the body 110 relative to a horizontal plane.

The gyro sensing module 176a may include a gyro sensing function regarding three axes orthogonal to each other in a spatial coordinate system. Information collected by the gyro sensing module 176a may be roll, pitch, and yaw information. The processing module may calculate a direction angle of a cleaner 1 or 1' by integrating the roll, pitch, and yaw angular speeds.

The azimuth angle sensor 176 may include an acceleration sensing module 176b which senses acceleration. The acceleration sensing module 176b has an acceleration sensing function regarding three axes orthogonal to each other in a spatial coordinate system. A predetermined processing module calculates a speed by integrating the acceleration, and may calculate a movement distance by integrating the speed.

The azimuth angle sensor 176 may include a magnetic field sensing module 176c which performs magnetic field sensing. The magnetic sensing module 176c may have a magnetic field sensing function regarding three axes orthogonal to each other in a spatial coordinate system. The magnetic field sensing module 176c may sense the magnetic field of the Earth.

The border signal detector 177 detects the border signal of the wire 290 outside the moving robot 100. The border signal detector 177 may be disposed at the front of the body 110. In doing so, while the moving robot 100 moves in a forward direction which is the primary travel direction, it is possible to sense the border of the travel area in advance. The border signal detector 177 may be disposed in an inner space of the bumper 112b.

The border signal detector 177 may include a first border signal detector 177a and a second border signal detector 177b which are arranged leftward and rightward from each other. The first border signal detector 177a and the second border signal detector 177b may be disposed at the front of the body 110.

When the border signal is a magnetic field signal, the border signal detector 177 includes a magnetic field sensor. The border signal detector 177 may be implemented using a coil to detect a change in a magnetic field. The border signal detector 177 may sense at least a magnetic field of an upward-downward direction. The border signal detector 177 may sense a magnetic field on three axes which are spatially orthogonal to each other.

The GPS detector 178 may be provided to detect a GPS signal. The GPS detector 178 may be implemented using a Printed Circuit Board (PCB).

The cliff detector 179 detects presence of a cliff in a travel surface. The cliff detector 179 may be disposed at the front of the body 110 to detect presence of a cliff in the front of the moving robot 100.

The sensing unit 170 may include an opening/closing detector (not shown) which detects opening/closing of at least one of the first opening and closing door 117 or the second opening and closing door 118. The opening/closing detector may be disposed at the case 112.

The moving robot 100 includes the controller 190 which controls autonomous traveling. The controller 190 may process a signal from the sensing unit 170. The controller 190 may process a signal from the input unit 164.

The controller 190 may control the first driving motor 123(L) and the second driving motor 123(R). The controller 190 may control driving of the blade motor 132. The controller 190 may control outputting of the output unit 165.

The controller 190 includes a main board (not shown) which is disposed in the inner space of the body 110. The main board means a printed circuit board (PCB).

The controller 190 may control autonomous traveling of the moving robot 100. The controller 190 may control driving of the traveling unit 120 based on a signal received from the input unit 164. The controller 190 may control driving of the traveling unit 120 based on a signal received from the sensing unit 170.

Hereinafter, controlling travel of the moving robot 100 will be described in detail with reference to FIGS. 8 to 14. The tilt information may include information on a tilt value or angle (Ag). The tilt value Ag may be determined to be a value relating to a degree of tilting of the traveling surface (S) relative to a virtual horizontal plane. The tilt information may include information on a tilt direction. Throughout this specification, the tilt direction may be a direction corresponding to an upward inclination direction of the traveling surface (S).

Figure 8:
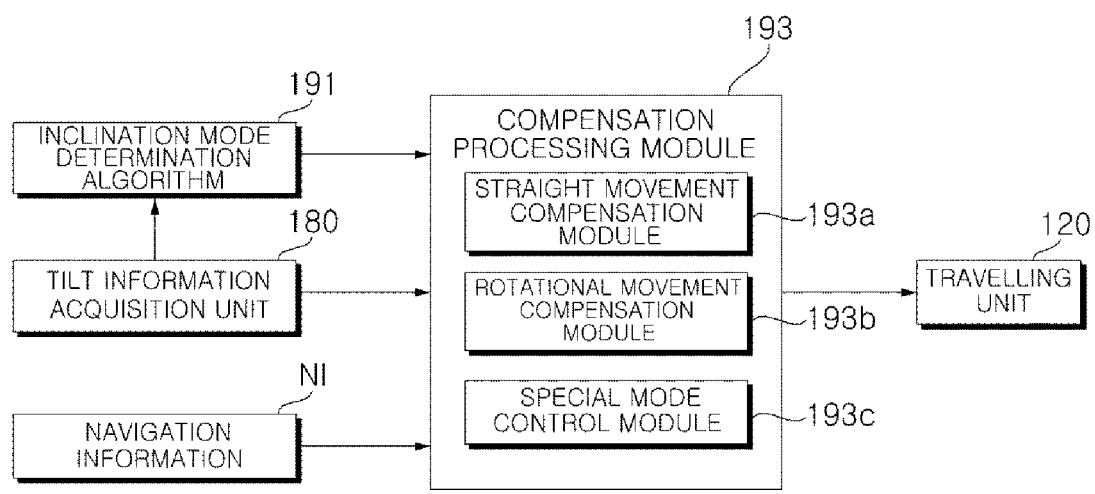
FIG. 8 is a block diagram illustrating a control relationship of a compensation processing module of the moving robot shown in FIG. 7.

Referring to FIG. 8, the moving robot 100 may implement a predetermined inclination mode. The controller 190 may determine whether to activate (on/off) the predetermined inclination mode. The controller 190 may determine whether a predetermined inclination mode condition is satisfied, based on the acquired tilt information. When it is determined that the inclination mode condition is satisfied, the controller 190 activates the inclination mode.

For example, the controller 190 may preset an inclination mode determination algorithm 191 so as to determine whether to activate the inclination mode. The tilt information acquisition unit 180 may transmit a sensed signal to the inclination mode determination algorithm 191. The inclination mode determination algorithm 191 may be preset to determine whether a predetermined inclination mode condition is satisfied based on tilt information. For example, whether the inclination mode condition is satisfied may be preset to be determined by comparing a tilt value Ag corresponding to the acquired tilt information with a predetermined reference value.

For example, the inclination mode condition may be preset to be satisfied when a tilt value Ag corresponding to tilt information acquired at a current position exceeds a predetermined reference value. The inclination mode condition may be predetermined to be a condition in which the tilt value Ag is greater than the predetermined reference level, or a condition in which the tilt value Ag is equal to or greater than the predetermined reference value. In any of the two conditions, the inclination mode condition is satisfied when the tilt value Ag exceeds the predetermined reference value.

In another example, the inclination mode condition may be preset to be satisfied when a tilt value Ag corresponding to tilt information exceeds a predetermined reference value (or threshold value) for a predetermined period of time (or threshold time) or more while the body 110 moves. The inclination mode condition may be preset to be a condition in which the tilt value Ag is greater than the predetermined reference value for the predetermined period of time or more, or a condition in which the tilt value Ag is equal to or greater than the predetermined reference value for the predetermined period of time or more. In any of the two conditions, the inclination mode condition is satisfied when the tilt value Ag exceeds the predetermined reference value for the predetermined period of time or more. In doing so, in the case where a tilt value increases in a relatively short period of time due to vibration or a local surface curve during traveling of the moving robot, the inclination mode remains deactivated, thereby reducing a probability that the inclination mode is unnecessarily activated.

When it is determined that the inclination mode condition is satisfied, the inclination mode determination algorithm 191 transmits a predetermined determination signal to a compensation processing module 193. The compensation processing module 193 may receive the tilt information directly from the tilt information acquisition unit 180 or through the inclination mode determination algorithm 191.

The compensation processing module 193 may perform a compensation control based on the acquired tilt information. The tilt information may include information on a tilt direction. The tilt direction means a downward direction of a tilt.

When the traveling surface S has an inclination equal to or greater than a predetermined reference inclination, the compensation processing module 193 may perform a predetermined compensation control (straight movement compensation, rotational movement compensation) to match an actual route Tr and Cr with a target route Tt and Ct as much as possible. When the moving robot 100 moves on a horizontal traveling surface S, the compensation processing module 193 does not perform the compensation control and the target route Tt and Ct and the actual route Tr and Cr match with each other. However, unless the compensation module 192 performs the compensation control when the moving robot 100 travels on a traveling surface S having an inclination equal to or greater than the predetermined reference inclination, it is not possible to offset slipping of the moving robot 100 in a downward inclination direction SL of the travel surface S and there may be a considerable difference between the target route Tt and Ct and the actual route Tr and Cr.

In this case, when the traveling surface S has an inclination equal to or greater than the predetermined level, the inclination mode condition is satisfied and thus the inclination mode is activated. Once the activation mode is activated, the compensation processing module 193 performs the compensation control.

The compensation processing module 193 may include a straight movement compensation module 193*a* which performs a predetermined straight movement compensation control in order to match an actual straight route Tr with a target straight route Tt as much as possible when the traveling surface S has an inclination equal to or greater than the predetermined level.

The compensation processing module 193 may include a rotational movement compensation module 193*b* which performs a predetermined rotational movement compensation control in order to match an actual rotational route Cr with a target rotational route Ct at the maximum when the traveling surface S has an inclination equal to or greater than the predetermined level.

The compensation processing module 193 may include a special mode control module 193*c* which activates a special mode of a direction converting motion, which will be described later, when the traveling surface S has an inclination equal to or greater than the predetermined level. When the special mode of the direction converting motion is activated, the special mode control module 193*c* may control the traveling unit 120 to be driven in a second driving method that is different from a first driving method which is implemented when the direction converting motion is performed while the special mode is deactivated.

Meanwhile, the moving robot 100 may acquire predetermined navigation information NI. The navigation information NI is information about an error between a target route and an actual route. For example, in the case where the moving robot 100 has returned back to the docking device 200 after traveling, if there is no such an error, a sum of displacement recognized by the moving robot 100 should be 0, theoretically. However, if there is a difference between the target route and the actual route, the difference may be recognized as the error. As the navigation information NI about such an error is input to the compensation processing module 193, the compensation processing module 193 is capable of learning by itself. For example, a coefficient which determines a degree of compensation by the compensation processing module 193 may be preset to change based on the input navigation information NI.

Figure 9:
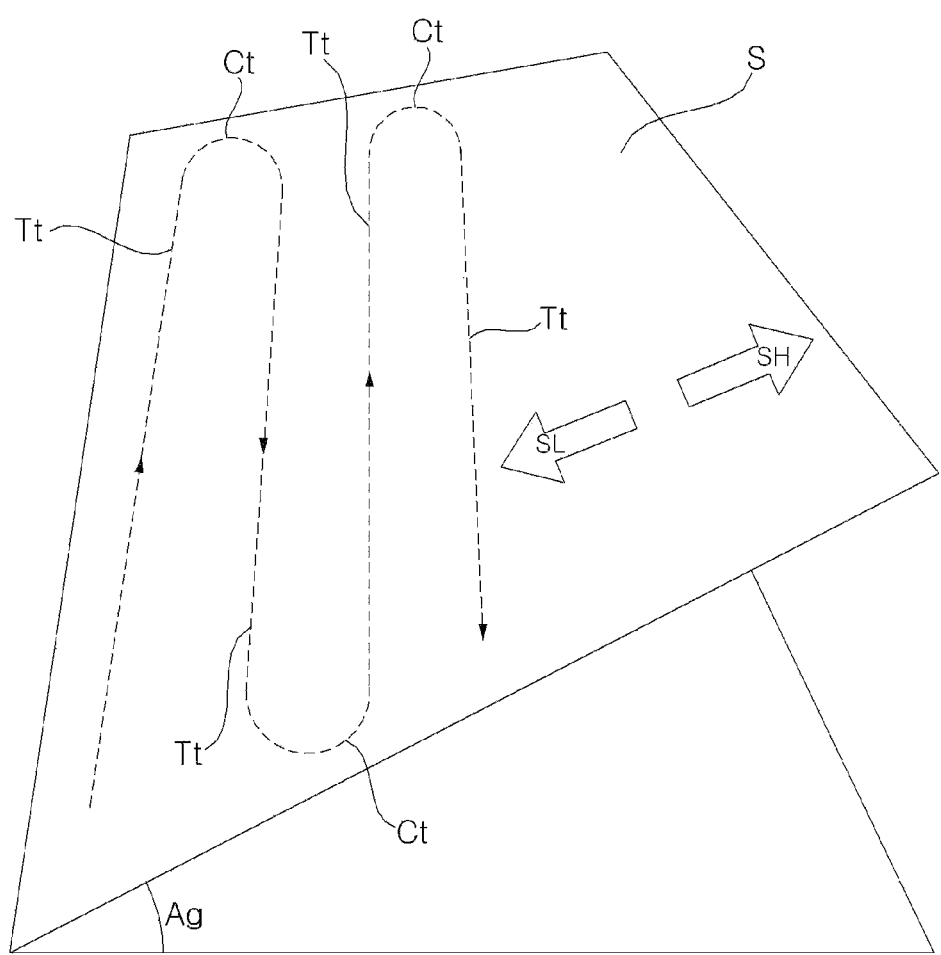
FIG. 9 is a conceptual diagram illustrating an example of an inclined travel surface S and an example of a predetermined pattern route Tt and Ct aimed by the moving robot shown in FIG. 1.
Figure 12:
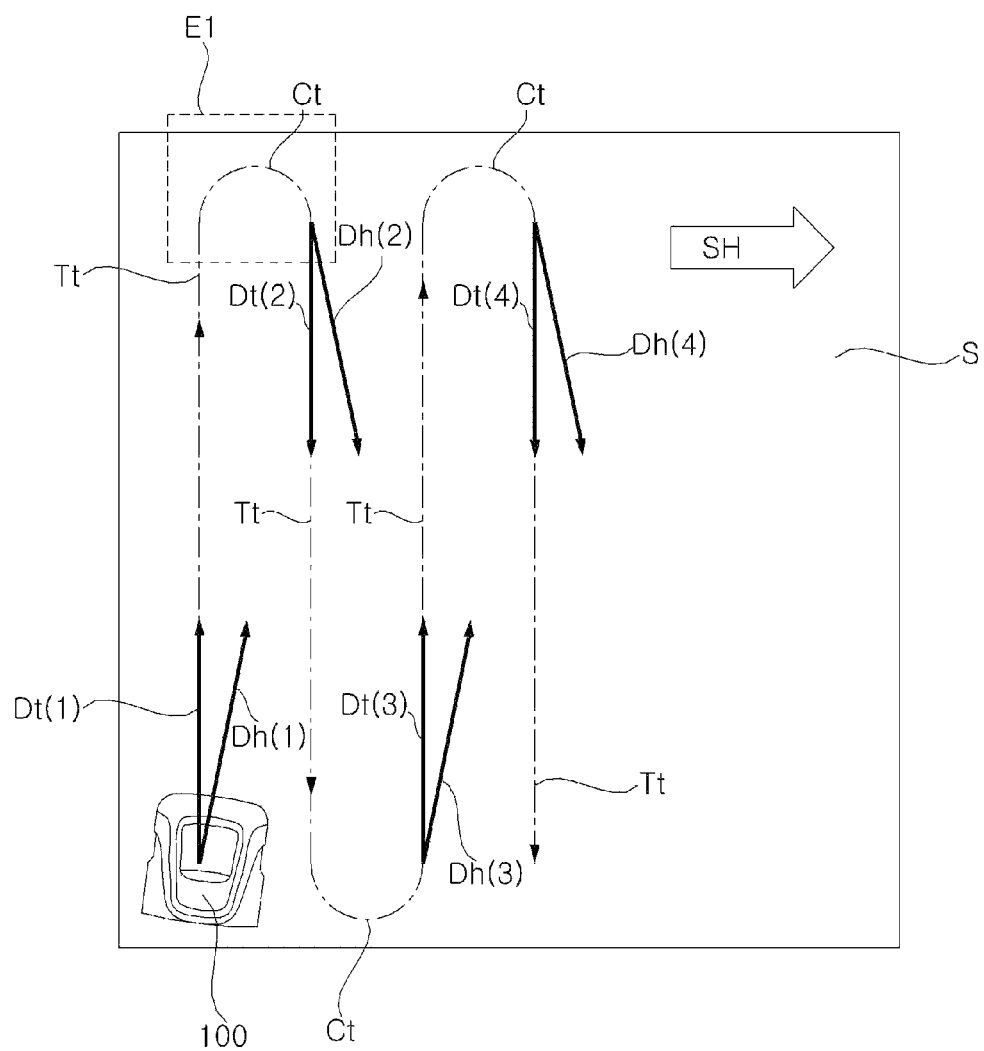
FIG. 12 is a plan conceptual diagram illustrating an example in which the moving robot moves along the pattern route Tt and Ct shown in FIG. 9 and in the case Q where straight movement compensation is performed as shown in FIG. 10.

Referring to FIGS. 9 and 12, the moving robot 100 may travel according to a pattern traveling mode. A predetermined pattern traveling mode is preset to move the body 110 along a predetermined pattern route Tt and Ct. The pattern traveling mode include a predetermined algorithm for driving at least the traveling unit 120 The pattern traveling mode may include an algorithm for driving the traveling unit 120 in accordance with a signal sensed by the sensing unit 170.

In one example, the moving robot 100 moving according to the pattern traveling mode may move in a travel area in a zigzag fashion by repeatedly performing the following steps: moving straight forward, making a 180° turn, and then moving along a straight route which is spaced apart in parallel from a previous straight route.

In another example, the moving robot 100 moving according to the pattern traveling mode may move in the travel area in a zigzag fashion by repeatedly performing the following steps: moving straight forward to a border of a travel area, making a 180° turn in response to a signal sensed by the border signal detector 177, and then moving along a straight route which is spaced apart in parallel from a previous straight route. In this case, each target straight route Tt of the pattern route Tt and Ct may have a different length depending on a border of an area.

In addition, there may be a pattern traveling mode for moving the body 110 along various pattern routes. In one embodiment, the moving robot 100 is a lawn mower robot, and the lawn mower robot moves according to the pattern traveling mode while rotating the blade 131, thereby thoroughly cutting grass in a travel area.

The pattern route Tt and Ct is preset irrespective of an inclination of the traveling surface S. That is, the pattern route Tt and Ct is an abstract target route preset by an algorithm of the pattern traveling mode. When the moving robot 100 travels on a horizontal travel surface S according to the pattern traveling mode, the actual route Tr and Cr becomes the pattern route Tt and Ct. The controller 190 may perform the compensation control with reference to the pattern route Tt and Ct.

The target straight route Tt is preset irrespective of inclination of the traveling surface S. The pattern route Tt and Ct may include a predetermined target straight route Tt. The pattern route Tt and Ct includes a plurality of target straight routes Tt spaced apart in parallel from each other.

Figure 10:
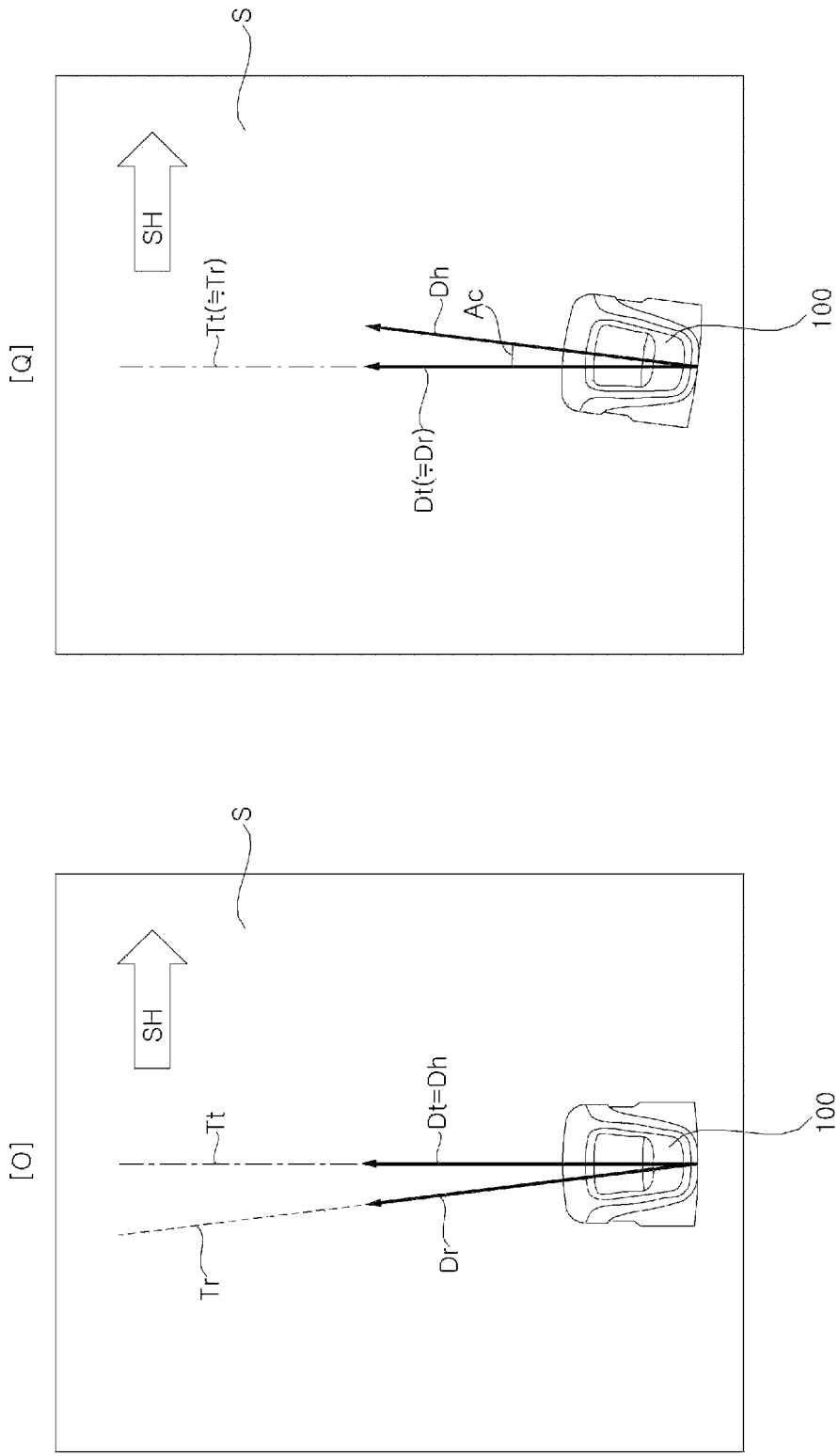
FIG. 10 are plan conceptual diagrams illustrating a target movement direction Dt, an actual movement direction, and a heading direction Dh when the moving robot moves across an upward inclination direction SH of the inclined travel surface S and comparing the case O where straight movement compensation is not performed and the case Q where straight movement compensation is performed.

At a certain point in time when the predetermined target straight route Tt preset irrespective of the inclination of the traveling surface S is given, a target movement direction Dt is a direction in which the target straight route Tt extends. For example, FIG. 10 shows an example of a certain point in time when the target straight route Tt of the moving robot 100 is given, and, in this case, the target movement direction Dt is a direction in which the target straight route Tt extends.

The target rotational route Ct is preset irrespective of the inclination of the traveling surface S. The pattern route Tt and Ct includes a predetermined target rotational route Ct. The target rotation curve Ct may be a route that connects two adjacent target straight routes Tt. The target rotational route Ct may be a route which rotates a movement direction of the moving robot 100 by 180° degree such that the moving robot 100 moves in a curved manner (curve movement).

Figure 14:
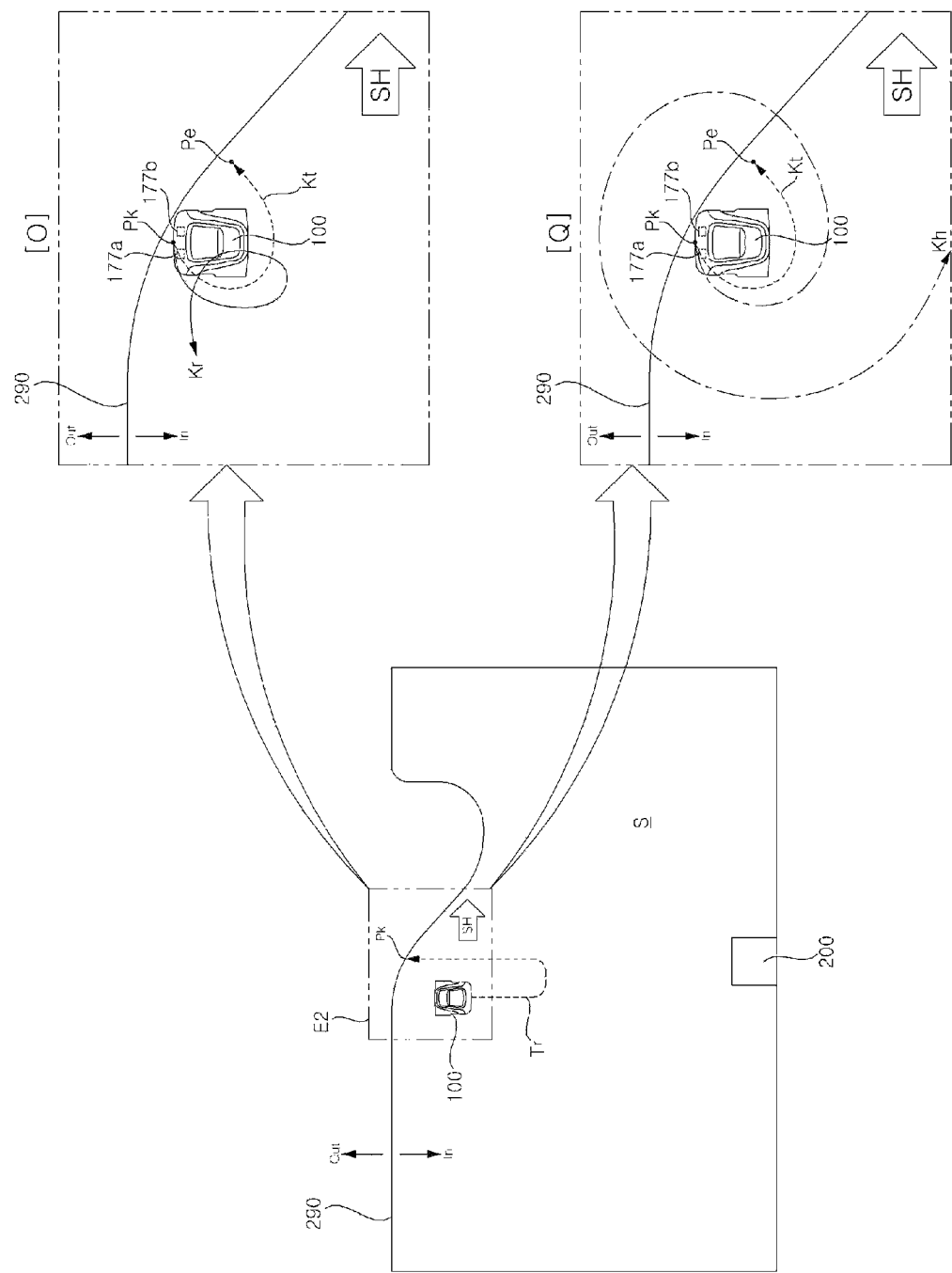
FIG. 14 is an exemplary plan view of a travel surface set by a wire, and zoomed-in views of a portion E2 providing plan conceptual views illustrating a normal direction converting route Kt, an actual direction converting route Kr, and a virtual direction converting route Kh when the moving robot performs a direction converting motion in proximity to the wire and comparing the case O where a special mode is deactivated and the case Q where the special mode is activated.

Referring to FIG. 14, the moving robot 100 may perform a predetermined direction converting motion. The direction converting motion is a motion of changing a movement direction of the moving robot 100. While the moving robot 100 moves, the controller 190 may determine whether a predetermined motion start condition is satisfied, based on a border signal sensed by the border signal detector 177. When the motion start condition is satisfied, the controller 190 may control the traveling unit 120 to start the direction converting motion.

The motion start condition may be preset to be satisfied when the border signal detector 177 has approached the wire 290 within a predetermined distance. For example, the motion start condition may be preset to be satisfied when strength of a border signal (e.g., strength of a magnetic field) sensed by the border signal detector 177 is equal to or greater than a predetermined level.

After the moving robot 100 starts the direction converting motion, the controller 190 may determine, based on the border signal, whether a predetermined motion termination condition is satisfied. When the motion termination condition is satisfied after the start of the direction converting motion, the controller 190 may control the traveling unit 120 to terminate the direction converting motion.

The motion termination condition may be preset to be satisfied when the border signal detector 177, which has moved away from the wire 290 after the start of the direction converting motion, approaches the wire 290 again within the predetermined distance. For example, the motion termination condition may be preset to be satisfied when strength of a border signal (e.g., strength of a magnetic field) sensed by the border signal detector 177 is equal to or greater than a predetermined level.

The border signal detector 177 may be disposed at the front of the body 110. In addition, a pair of border signal detectors 177*a* and 177*b* spaced apart leftward and rightward from each other at the front of the body 110 may be provided.

A movement direction of the front of the body 110 at the start of the direction converting motion may be preset to be a direction in which the front of the body 110 moves away from the wire 190. For example, a direction in which one border signal detector having sensed a greater magnetic field strength out of the pair of border signal detectors 177*a* and 177*b* disposed leftward and rightward from each other at the front of the body 110 is a direction closer than a direction in which the other border signal detector is disposed. Accordingly, the controller 190 may control the moving robot 100 to rotationally move toward a direction opposite to a direction in which one border signal detector having sensed the greater magnetic field strength out of the pair of border signal detectors 177*a* ad 177*b* is disposed. If the front of the body 110 moves out of the border of a travel area set by the wire 290, there is a higher probability that a facility or a human out of the border or the moving robot 100 itself is damaged. Using the above-described direction converting motion, it is possible to considerably reduce such a likelihood.

In the example of FIG. 14, when the front end of the moving robot 100 is located at a motion start point pk, the motion start condition is satisfied. The second border signal detector 177*b* located closer to the wire 290 out of the first border signal detector 177*a* and the second border signal detector 177*b* senses a greater magnetic field strength. Accordingly, a direction converting motion of the moving robot 100 starts with movement (left-turn motion) rotating in a left direction which is a direction opposite to a direction in which the second border signal detector 177*b* out of the first border signal detector 177*a* and the second border signal detector 177*b* is disposed.

In the example of FIG. 14, if the traveling surface S is a horizontal plane, a special mode may be deactivated and thus the moving robot 100 may carry out the direction converting motion while moving along a normal direction converting route Kt and terminates the direction converting motion at a motion end point Pe where the motion termination condition is satisfied. For example, a magnetic field strength sensed by the first border signal detector 177*a* at the motion end point Pe may be equal to or greater than a predetermined level, and thus, the motion termination condition may be satisfied.

Referring to FIGS. 9 to 12, the straight movement compensation control will be described with reference to FIGS. 9 to 12. Through the straight movement compensation control, it is possible to compensate for slipping of the moving robot 100 in a downward inclination direction of the travel surface S when the moving robot 100 moves to cross an upward inclination direction SH of the travel surface S.

The target movement direction Dt is preset irrespective of the inclination of the travel surface S. While the target movement direction Dt is preset, the controller 190 performs the straight movement compensation control. For example, the target movement direction Dt is an abstract movement direction preset by an algorithm of the pattern traveling mode. A target movement direction Dt of the moving robot 100 at a current point in time is a constant reference direction that is irrespective of inclination of the travel surface S, on which the moving robot 100 is placed at the current point in time, or a degree of the inclination of the travel surface S.

An actual movement direction Dr is a direction in which the moving robot 100 is actually moving. The actual movement direction Dr is a direction along which the moving robot 100 is found to move through observation. On the horizontal travel surface S, the actual movement direction Dr of the moving robot 100 becomes the target movement direction Dt. The controller 190 may perform the straight movement compensation control with reference to the target movement direction Dt. If the controller 190 performs the straight movement compensation control while the moving robot 100 crosses the travel surface S, the actual movement direction Dr becomes close to the target movement direction Dr.

A heading direction Dh is a direction in which the body 110 moves by the traveling unit 120 on the assumption that the travel surface S is horizontal. In this case, since the travel surface S is assumed horizontal, an actual movement direction on the travel surface S may be different from the heading direction Dh. That is, if the travel surface S is horizontal even though the travel surface S on which the moving robot 100 is placed at the current point in time has an inclination, a direction in which the moving robot 100 is going to move is the heading direction Dh.

The heading direction Dh is a direction of a traveling force Fh that the traveling unit 120 is preset to apply to the body 110. In this embodiment, the traveling force Fh is a force that is applied to the body 110 by rotation of the driving wheel 121. The heading direction Dh is a direction of the traveling force Fh that is applied to the body 110 by rotation of the pair of driving wheels 121(L) and 121(R). The driving force Fh is a force that is applied in a direction opposite to a direction of a frictional force which is applied to the travel surface S by the driving wheel 121 by rotation of the driving wheel 121.

When the target movement direction Dt crosses the upward inclination direction SH of the travel surface S, the controller 190 controls the traveling unit 120 by setting the heading direction Dh based on the tilt information. When the target movement direction Dt crosses the upward inclination direction SH of the travel surface S, the controller 190 controls the heading direction Dh to be a direction between the target movement direction Dt from a current position and the upward inclination direction SH of the travel surface S from the current position based on the tilt information.

A compensation angle Ac is an angle between the heading direction Dh and the target movement direction Dt. The controller 190 may calculate the compensation angle Ac based on acquired tilt information. The controller 190 may set the heading direction Dh to be a direction which is rotated from the target movement direction at the current position toward the upward inclination direction SH by the compensation angle Ac. The controller 190 may control the traveling unit 120 so as to generate a traveling force Fh in the set heading direction Dh.

When the acquired tilt information changes, the controller 1990 may set the heading direction Dh differently. When the acquired tilt information changes, the controller 190 may perform a control action to change the compensation angle Ac.

The controller 190 may perform a control action such that the compensation angle Ac increases in proportion to a tilt value corresponding to the tilt information. In addition, the controller 190 may control the target movement direction Dt such that the compensation angle Ac increases in proportion to proximity to a direction vertical to a tilting direction corresponding to the tilt information. In a condition in which an angle between the target movement direction Dt and the tilt direction is constant when viewed above, the controller 190 may perform a control action such that the compensation angle Ac increases in proportion to the tilt value.

The target straight route Tt is an abstract target route preset by a predetermined algorithm. The target straight route Tt may be preset irrespective of inclination of the travel surface S. A target straight route Tt of the moving robot 100 at the current point in time is a constant reference route that is irrespective of inclination of the travel surface S, on which the moving robot 100 is placed at the current point in time, or a degree of the inclination.

The actual straight route Tr is a route along which the moving robot 100 has actually moved. The actual straight route Tr is a route along which the moving robot 100 is found to move through observation. The target straight route Tt is identical to an actual straight route Tr of the case where the moving robot 100 drives the traveling unit 120 in a method preset by an algorithm of the pattern traveling mode on a horizontal travel surface.

The controller 190 controls the heading direction Dh to be different from the target movement direction Dt only when the inclination mode is activated. When it is determined, based on tilt information, that the travel surface S is horizontal, the controller 190 deactivates the inclination mode and performs a control such that the heading direction Dh becomes identical to the target movement direction Dt. In the case where the moving robot 100 travels on a horizontal travel surface S, even if the traveling unit 120 is controlled such that a direction in which the target straight route Tt extends becomes identical to the heading direction Dh, the target straight route Tt and the actual straight route Tr would match with each other.

Referring to O in FIG. 10, if the target movement direction Dt, which is a direction in which the target straight route Tt extends, matches with the heading direction Dh when the moving robot 100 travels on the travel surface S with an inclination equal to or greater than a predetermined level, the actual movement direction Dr may become a direction inclined further downward from the target movement direction Dt, and the actual straight route Tr may be noticeably different from the target straight route Tt.

Referring to the example Q of FIG. 10, while the moving robot 100 travels on the travel surface S with an inclination equal to or greater than a predetermined reference inclination, if the inclination mode is activated and the heading direction Dh is set to be a direction between the target movement direction Dt and the upward inclination direction SH, the actual movement direction DR becomes relatively close to the target movement direction Dt and the actual straight route Tr becomes relatively close to the target straight route Tt.

Figure 11:
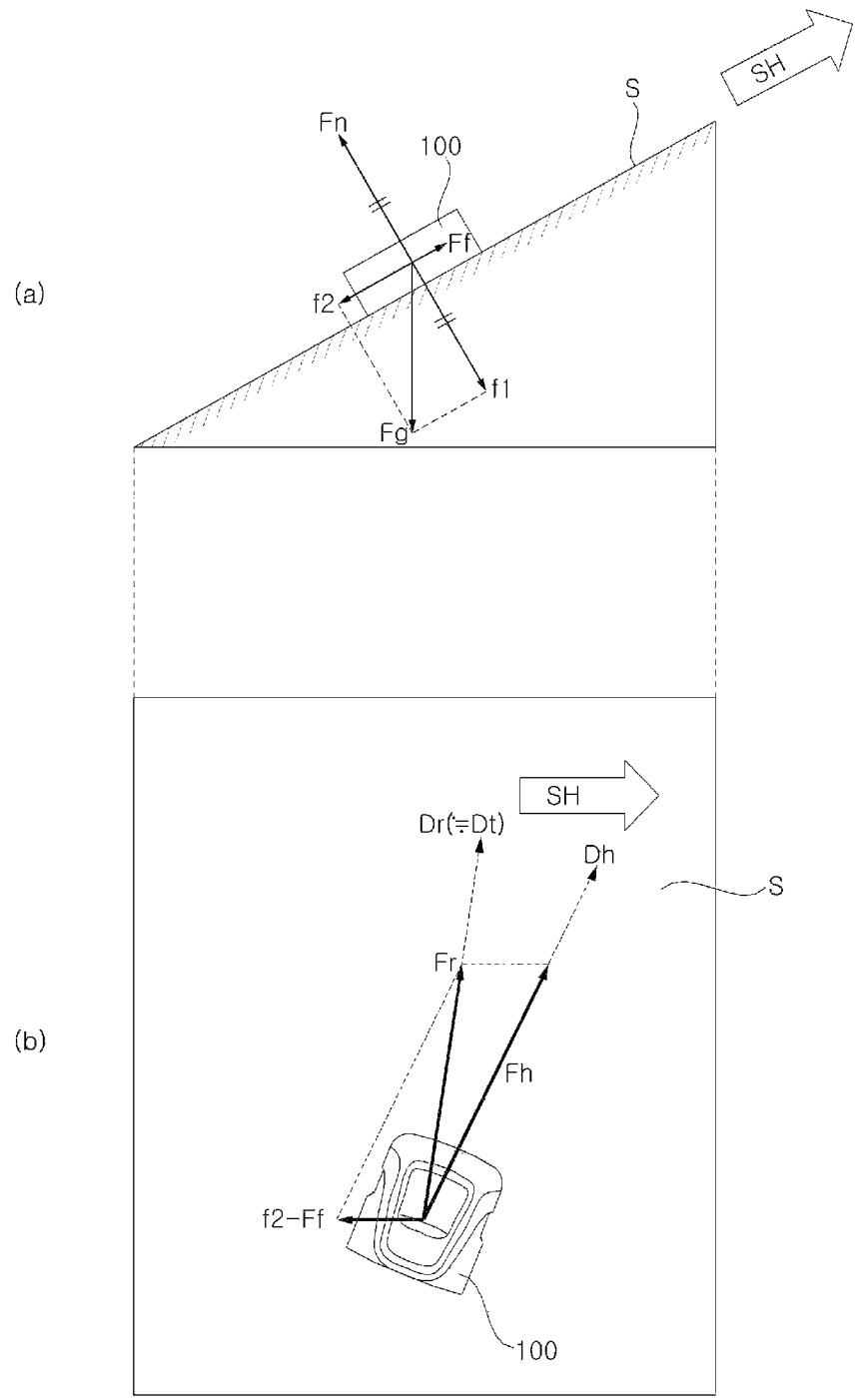
FIG. 11 are conceptual diagrams showing an analysis of forces applied to a moving robot in the case Q where straight movement compensation is performed as shown in FIG. 10.

Referring to FIG. 11, the principle of Q in FIG. 10 is as follow. When the moving robot 100 travels on an inclined travel surface S across the upward inclination direction SH, a gravitational force Fg of the moving robot 100, a normal force Fn exerted by the travel surface S, a traveling force Fh exerted by the traveling unit 120, and a frictional force Ff exerted toward the upward inclination direction SH of the travel surface S due to slipping of the moving robot 100 in a downward inclination direction SL are applied. A component f1 of the gravitational force Fg perpendicular to the travel surface S is completely offset by the normal force Fn which is an opposite force thereto. In addition, a component f2 of the gravitational force Fg parallel to the travel surface S is directed in the downward inclination direction SL, and the frictional force Ff is directed in the upward inclination direction SH. Thus, a force f2–Ff is obtained as a result of subtracting the component f2 by the frictional force Ff, and the force f2–Ff is directed in the downward inclination direction SL. A resultant force Fr, which is a combination of the force f2–Ff and the traveling force Fh, is an actual force applied to the moving robot 100, and a direction of the resultant force Fr tils from the direction of the traveling force Fh toward the downward inclination direction. The closer the angle between the direction of the resultant force Fr and the direction of the traveling force Fh become close to the compensation angle, the closer the target straight route Tt and the actual straight route Tr become to each other. That is, the direction of the traveling force Fh becomes the heading direction Dh, and the direction of the resultant force Fr becomes the actual movement direction Dr.

Referring to FIG. 12, in the case where the body 110 is located at a position corresponding to a position on the target straight route Tt while the pattern traveling mode is activated, the heading direction Dh may be set while the target movement direction Dt is considered a direction in which the target straight route Tt extends. A reference target movement direction Dt(1), Dt(2), Dt(3), or Dt(4) may depend on which target straight route Tt that the body 110 is located from among a plurality of target straight routes Tt. In addition, a heading direction Dh1(1), Dh(2), Dh(3), or Dh(4) may be set according to the reference target movement direction. In FIG. 12, when the moving robot 100 is located at a position corresponding to a position on the target straight route Dt(1), a heading direction Dh(1) is set. When the moving robot 100 is located at a position corresponding to a position on a target straight route Dt(2), a heading direction Dh(2) is set. When the moving robot 100 is located at a position corresponding to a position on a target straight route Dt(3), a heading direction Dh(3) is set. When the moving robot 100 is located at a position corresponding to a position on a target straight route Dt(4), a heading direction Dh(4) is set.

Meanwhile, referring to FIG. 13, the rotational movement compensation control will be described in more detail. Through the rotational movement compensation control, it is possible to compensate for slipping of the moving robot 100 in the downward direction SL when the moving robot 100 rotationally moves by making a turn in the upward inclination direction SH of the travel surface S.

A target rotational route Ct is an abstract target route that is preset by a predetermined algorithm. The target rotational route Ct is preset irrespective of inclination of the travel surface S. While the target rotational route Ct is preset, the controller 190 performs the rotational movement compensation control. A target rotational route Ct of the moving robot 100 at a current point in time is a constant reference route that is irrespective of inclination of the travel surface S, on which the moving robot 100 is placed at the current point in time, or a degree of the inclination.

An actual rotational route Cr is a route along which the moving robot 100 has actually moved. The actual rotational route Cr is a route along which the moving robot 100 is found to move through observation. The target rotational route Ct is identical to an actual rotational route Cr of the case where the moving robot 100 drives the traveling unit 120 in a method preset by an algorithm of the pattern traveling mode on a horizontal travel surface.

A virtual rotational route Ch is a virtual route along which the body 110 moves by the traveling unit 120 on the assumption that the travel surface S is horizontal. That is, when the rotational movement compensation control is performed based on tilt information of the travel surface S while the moving robot 100 is placed on the travel surface S at a current point in time, a rotational route of the case where a driving method of the traveling unit 120 according to the rotational movement compensation control is implemented on the horizontal travel surface S becomes the virtual rotational route Ch.

A start point Po is a point at which the moving robot 100 starts rotational movement. The start point Po is a start point of the target rotational route Ct. In addition, the start point Po is a start point of the actual rotational route Cr. In addition, the start point Po is a start point of the virtual rotational route Ch.

Furthermore, a target end point Pt is an end point of the target rotational route Ct. An actual end point Pr is an end point of the actual rotational route Cr. A virtual end point Ph is an end point of the virtual rotational route Ch.

The start point Po of the target rotational route Ct, the start point Po of the actual rotational route Cr, and the start point Po of the virtual rotational route Ch match with each other, but the respective end points Pt, Pr, and Ph may differ depending on inclination of the travel surface S.

When the moving robot 100 travels on a horizontal travel surface, the controller 190 drives the traveling unit 120 in a preset first method such that the body 110 moves along the target rotational route Ct. That is, the first method of driving the traveling unit 120 is a method of driving the traveling unit 120 in a state in which the inclination mode is deactivated.

For example, the method of driving the traveling unit 120 (a first method, a second method, a first driving method, and a second driving method) may be a method of controlling a rotation direction and a rotation speed of each of the pair of the driving wheels 120(L) and 120(R) at each time.

When the moving robot 100 travels on a travel surface having an inclination equal to or greater than a predetermined reference inclination, the controller 190 may determine, based on the tilt information, whether the target end point Pt is located further toward the upward inclination direction compared to the start point Po (at this point, when the travel surface S has an inclination equal to or greater than the predetermined reference inclination, the controller 190 may activate the inclination mode). In this case, on the assumption that tilt information for a current position is the same in the target rotational route Ct, the controller 190 may determine whether the target end point Pt is located further toward the upward inclination direction compared to the start point Po. The example of FIG. 13 shows that the target end point Pt is located further toward the upward inclination direction SH compared to the start point Po.

When the target end point Pt is located toward the upward inclination direction SH compared to the start point Po, the controller 190 may drive the traveling unit 120 in the second method such that the virtual end point Ph is located further toward the upward inclination direction SH compared to the target end point Pt. The second method is preset different from the first method. The second method of driving the traveling unit 120 is a method of driving the traveling unit 120 when the inclination mode is activated.

In response to a change in acquired tilt information, the controller 190 drives the traveling unit 120 to change a distance in the upward inclination direction SH between the virtual end point Ph and the start point Po. The controller 190 controls the traveling unit 120 such that the distance in the upward inclination direction SH between the virtual end point Ph and the start point Po increases in proportion to a tilt value. Specifically, the second method of driving the traveling unit 120 is a driving method which is changed in response to the change of the tilt information.

The controller 190 drives the traveling unit 120 in the second method only when the inclination mode is activated. When it is determined, based on the tilt information, that the travel surface S is horizontal, the controller 190 deactivates the inclination mode and performs a control such that the actual rotational route Cr becomes identical to the target rotational route Ct.

When the body 110 starts to move along the target rotational route Ct, the controller 190 drives the traveling unit 120 in the second method. When the body 110 starts to move along the target rotational route Ct while the pattern traveling mode is activated, the controller 190 starts to drive the traveling unit 120 in the second method.

Referring to O of FIG. 13, if the traveling unit 120 is driven in the first method without the inclination mode being activated when the moving robot 100 rotationally moves upward over the travel surface S having an inclination equal to or greater than a predetermined reference inclination, the actual rotational route Cr may have a short radius of rotation compared to the target rotational route Ct. In this case, the actual end point Pr may be located further toward the downward inclination direction compared to the target end point Pt, and the actual rotational route Cr may be noticeably different from the target rotational route Ct.

Referring to the example Q of FIG. 13, while the moving robot 100 rotationally moves upward over the travel surface S having an inclination equal to or greater than a predetermined reference inclination, if the inclination mode is activated and thereby the traveling unit 120 is driven, the actual end point Pr becomes relatively close to the target end point Pt and the actual rotational route Cr becomes relatively close to the target rotational route Ct.

Meanwhile, referring to FIG. 14, the special mode for the direction converting motion will be described in more detail as below. Using the special mode, it is possible to address the problem that, when the moving robot 100 performs the direction converting motion on an inclined travel surface S, the motion termination condition is hardly satisfied because the moving robot 100 slips toward the downward inclination direction SL and move away from the wires 290.

When the moving robot 100 is placed in a horizontal travel surface S, the special mode is not activated. A normal direction converting route Kt in FIG. 14 is an example of a route of the case where the moving robot 100 performs the direction converting motion on a horizontal travel surface. In the example of FIG. 14, the moving robot 100 determines that the motion start condition is satisfied, based on a border signal which is sensed at a motion start point Pk in a travel area In. If a travel surface is a horizontal, the moving robot 100 moves along the normal direction converting travel lath Kt by driving the traveling unit 120 in a first driving method which will be described later. While moving along the normal direction converting route Kt, the moving robot 100 determines that the motion termination condition is satisfied, based on a border signal sensed at a motion end point Pe, and terminates the direction converting motion.

An actual direction converting route Kr is a route along which the moving robot 100 has actually moved. The actual direction converting route Kr is a route along which the moving robot 100 is found to move through observation. The normal direction converting route Kt is identical to an actual direction converting route Kr of the case where the moving robot 100 drives the traveling unit 120 in a preset method on a horizontal travel surface while the special mode is deactivated.

A virtual direction converting route Kh is a virtual route along which the body 110 moves by the traveling unit 120 on the assumption that the travel surface is horizontal. That is, when the rotational movement compensation control is performed based on tilt information of a traveling surface S while the moving robot 100 is currently placed on the travel surface S, a direction converting route of the case where the method of driving the traveling unit 120 according to the rotational movement compensation control is implemented on a horizontal travel surface is the virtual direction converting route Kh.

The virtual direction converting route Kh may include a route of which a radius of rotation increasingly grows. The virtual direction converting route Kh may include a route of which a radius of rotation increasingly grows toward a virtual movement direction. For example, the virtual direction converting route Kh may include a rotational route in a spiral shape.

When the moving robot 100 performs the direction converting motion while traveling on a horizontal travel surface, the controller 1990 drives the traveling unit 120 in a preset first driving method such that the body 110 moves along a predetermined normal direction converting route Kt. That is, the first driving method of driving the traveling unit 120 is a driving method for converting a direction of the traveling unit 120 in a state in which the special mode is deactivated.

When the moving robot 100 performs the direction converting motion while traveling on a travel surface having an inclination equal to or greater than a predetermined reference inclination, the controller 190 drives the traveling unit 120 in the second driving method such that the virtual direction converting route Kh becomes different from the normal direction converting route Kt (in this case, when the travel surface S has the inclination equal to or greater than the predetermined reference inclination, the controller 190 may activate the special mode). The example Q of FIG. 14 shows a virtual direction converting route Kh of the case where driving of the traveling unit 120 in the second driving method is performed on an assumed horizontal travel surface. If the motion start condition is satisfied when it is determined, based on tilt information of the travel surface, that the inclination of the travel surface is equal to or greater than the predetermined reference inclination, the controller 190 drives the traveling unit 120 in the second driving method.

The second driving method is preset different from the first driving method. The second driving method of driving the traveling unit 120 is a method of driving the traveling unit 120 when the motion start condition is satisfied while the special mode is activated.

In response to a change in acquired tilt information, the controller 190 may drive the traveling unit 120 so as to change the virtual direction converting route Kh. The controller 190 may drive the traveling unit 120 such that a radius rotation of the virtual direction converting route Kh increasingly grows in proportion to a tilt value.

Referring to the example O of FIG. 14, In the case where the moving robot 100 performs the direction converting motion on a travel surface S having an inclination equal to or greater than a predetermined reference inclination, when the traveling unit 120 is driven in the first driving method without the special mode being deactivated, the actual direction converting route Kr may have a route which slides toward the downward inclination direction compared to the normal direction converting route Kt and circles around. In this case, if the downward inclination direction SL is a direction distal from the wire 290, due to slipping of the moving robot 100 toward the downward inclination direction, the moving robot 100 may not be able to approach the wire 290 up to a point where the motion termination condition is satisfied.

Referring to the example Q of FIG. 14, in the case where the moving robot 100 performs the direction converting motion on a travel surface S having an inclination equal to or greater than a predetermined reference inclination, when the special mode is activated and thereby the traveling unit 120 is driven in the second driving method, the moving robot 100 may receive a traveling force toward the upward inclination direction SH for a longer time. In this case, although the travel surface s has the inclination, the moving robot 100 is able to approach the wire 290 up to a point where the motion termination condition is satisfied, and therefore, the moving robot 100 may terminate the direction converting motion properly.

According to the above-described solution, in the case where a travel surface has an inclination, even though a moving robot slips in a downward inclination direction, it is possible to induce the moving robot to travel in close proximity to a target route. According to the above-described solution, by taking into consideration an inclination of a travel surface, it is possible to control a moving robot to move along a route in the closest proximity to a target route. According to the above-described solution, it is possible to prevent a failure of the moving robot 100 to terminate a direction converting motion, the failure which occurs because the moving robot 100 slips when converting a direction in accordance with a border signal from the wire.

In the case where a tilt value increases in a relatively short period of time due to vibration or a local surface curve during movement of the moving robot, the inclination mode may remain deactivated using the inclination mode condition, it is possible to reduce a probability of unnecessary activation of the inclination mode, by maintaining the inclination mode in a deactivated state.

A movement direction of the front of the body 110 at the start of the direction converting motion may be preset to be a direction in which the front of the body 110 moves away from the wire 190. Using the above-described direction converting motion, it is possible to considerably reduce a probability of a facility or a human out of the border, or the moving robot 100 itself to be damaged.

A moving robot according to an existing technology slips in a downward inclination direction when traveling on an inclined surface, thereby ended up with deviating from a target travel route. The first aspect of the present disclosure addresses this problem.

It is difficult for an outdoor moving robot to recognize a current position based on a ceiling, a nearby wall or furniture, and thus, even when such a moving robot slips on an inclined travel surface, it is not easy to recognize the moving robot's deviated from a target travel route. The second aspect allows the moving robot to travel in closest proximity to the target travel route by reflecting the inclination of the travel surface.

The third aspect of the present disclosure provides a travel control method optimal for each of various movement motions performed when a moving robot moves on an inclined travel surface.

To achieve these and other aspects, certain embodiments provide a moving robot including: a body defining an exterior; a traveling unit configured to move the body against a travel surface; an operation unit disposed in the body and configured to perform a predetermined operation; a tilt information acquisition unit configured to acquire tilt information on a tilt of the travel surface; and a controller configured to, when target movement direction being preset irrespective of an inclination of the travel surface crosses an upward inclination direction of the travel surface, control a heading direction, which is a direction of a traveling force (Fh) preset to be applied by the traveling unit to the body, to be a direction between the target movement direction and the upward inclination direction based on the tilt information.

To achieve these and other aspects, certain embodiments provide a moving robot including: a body defining an exterior; a traveling unit configured to move the body against a travel surface; an operation unit disposed in the body and configured to perform a predetermined operation; a tilt information acquisition unit configured to acquire tilt information on a tilt of the travel surface; and a controller. The controller may be further configured to: in a case of traveling on a horizontal travel surface, drive the traveling unit in a preset first method such that the body moves along the target rotational route; and, in a case of traveling on a travel surface having an inclination equal to or greater than a predetermined reference inclination, when it is determined, based on the tilt information, that a target end point of the target rotational route is located further toward an upward inclination direction of the travel surface compared to a start point of the target rotational route, control the traveling unit in a second method preset different from the first method such that a virtual end point of a virtual rotational route, along which the body moves by the traveling unit when the travel surface is assumed horizontal, is located further toward the upward inclination direction compared to the target end point.

The controller may be further configured to activate a predetermined inclination mode when it is determined, based on the tilt information, that a predetermined inclination mode is satisfied, and to control the heading direction to be different from the target movement direction only when the inclination mode is activated.

To achieve these and other aspects, certain embodiments may provide a moving robot including: a body defining an exterior; a traveling unit configured to move the body against a travel surface; an operation unit disposed in the body and configured to perform a predetermined operation; a tilt information acquisition unit configured to acquire tilt information about an inclination of the travel surface; and a controller configured to start a predetermined direction converting motion when it is determined, based on the border signal, that a predetermined motion start condition is satisfied while the body moves, and control the traveling unit to terminate the direction converting motion when it is determined, based on the border signal, that a predetermined motion termination condition is satisfied after the direction converting motion starts. The controller may be further configured to: in a case of performing the direction converting motion when traveling a horizontal travel surface, drive the traveling unit in a preset first driving method such that the body moves along a predetermined normal direction converting route; and, in a case of performing the direction converting motion when traveling on a travel surface having an inclination equal to or greater than a predetermined reference inclination, drive the traveling unit in a second driving method preset different from the first driving method such that a virtual direction converting route, along which the body moves by the traveling unit when the travel surface is assumed horizontal, becomes different from the normal direction converting route.

The motion start condition may be preset to be satisfied when the border signal detector approaches the wire within a predetermined distance. The motion termination condition may be preset to be satisfied when the border signal detector, which has moved away from the wire in response to start of the direction converting motion, approaches the wire within the predetermined distance again.

The border signal detector may be disposed at a front of the body. A moving direction of the front at a start of the direction converting motion may be preset to be a direction in which the front moves away from the wire.

According to the above-described embodiments, it is possible to induce the moving robot to travel in proximity to a target moving route, even though a moving robot slips in a downward inclination direction on a travel surface having an inclination. According to the above-described embodiments, by reflecting an inclination of a travel surface, it is possible to allow the moving robot to move to a travel path in closest proximity to a target travel route.

According to the above-described embodiments, when the moving robot 100 performs a direction converting motion in accordance with a border signal of a wire, it is possible to prevent that the moving robot 100 fails to terminate the direction converting motion since the moving robot slips in a downward inclination direction.

When a tilt value increases in a relatively short period of time due to vibration or a local surface curve during movement of a moving robot, the inclination mode is maintained to be deactivated based on the inclination mode condition, thereby reducing a probability that the inclination mode starts unnecessarily.

A moving direction of the front of the body 110 at the start of the direction converting motion may be preset to be a direction in which the front of the body moves away from the wire, and thus, using the above-described direction converting motion, it is possible to considerably reduce a probability of a facility or a human out of the border, or the moving robot 100 itself to be damaged.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described herein with reference to cross-section illustrations that are schematic illustrations of idealized embodiments (and intermediate structures) of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the present disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art.

What is claimed is:

1. A moving robot comprising:
   a body;
   a motor configured to generate a driving force to move the body along a travel surface;
   a tilt sensor configured to acquire tilt information related to a tilt of the travel surface; and
   a controller configured to, when a target movement direction crosses an upward inclination direction of the travel surface, manage the motor based on the tilt information such that a heading direction corresponding to a travelling force applied to the body due to the driving force is between the target movement direction and the upward inclination direction,
   wherein the controller is further configured to:
      selectively activate an inclination mode based on the tilt information, and
      manage the motor such that the heading direction is different from the target movement direction only when the inclination mode is activated.

2. The moving robot of claim 1, further comprising:
   a wheel configured to be rotated by the driving force, wherein the traveling force is applied to the body by rotation of the wheel.

3. The moving robot of claim 1, wherein the controller is further configured to manage the motor such that the heading direction corresponds to the target movement direction when the tilt information indicates that the travel surface is horizontal.

4. The moving robot of claim 1, wherein the controller is further configured to manage the motor such that, when the tilt information indicates a change in the tilt of the travel surface, an angle between the heading direction and the target movement direction is changed.

5. The moving robot of claim 4, wherein:
   the tilt information identifies a tilt value associated with the travel surface, and
   the controller is further configured to manage the motor such that the angle increases in proportion to the tilt value.

6. The moving robot of claim 1, wherein the controller is further configured to:
   determine to activate the inclination mode when the tilt information indicates that a tilt value for the travel surface exceeds a threshold value for at least a threshold period of time while the body is moving.

7. The moving robot of claim 1, wherein the controller is further configured to determine a target straight route for the body irrespective of the tilt of the travel surface, the target movement direction corresponding to a direction in which the target straight route extends.

8. The moving robot of claim 7, wherein the controller is further configured to manage the motor based on a particular pattern route that includes a plurality of target straight routes that are spaced apart from each other.

9. The moving robot of claim 1, wherein the controller is further configured to manage the motor based on a target rotational route such that:
   when the tilt information indicates that the tilt of the travel surface is less than a reference inclination, the driving force causes the body to move along the target rotational route; and
   when the tilt information indicates that the tilt of the travel surface is equal to or greater than the reference inclination and a target end point of the target rotational route is located further toward an upward inclination direction of the travel surface compared to a start point of the target rotational route, the driving force causes the body to move such that a virtual end point of a virtual rotational route, along which the body would move when the travel surface is horizontal, is located further along the upward inclination direction compared to the target end point.

10. The moving robot of claim 1, further comprising:
    a border signal sensor configured to detect a border signal from an external wire,
    wherein the controller is further configured to manage the motor to selectively perform a direction converting motion such that:
       the direction converting motion is started when the border signal indicates that a motion start condition is satisfied while the body moves, and is terminated when the border signal indicates that a motion termination condition is satisfied;
       the direction converting motion includes moving the body along a normal direction converting route when the tilt of the travel surface is less than a reference inclination; and
       the direction converting motion includes, when the tilt of the travel surface is equal to or greater than the reference inclination, moving the body such that a virtual direction converting route, along which the body moves when the travel surface is assumed horizontal, becomes different from the normal direction converting route.

11. A moving robot comprising:
a body;
a motor configured to generate a driving force to move the body along a travel surface;
a tilt sensor configured to acquire tilt information about an inclination of the travel surface; and
a controller configured to manage the motor based on a target rotational route such that:
when the inclination of the travel surface is less than a reference inclination, the driving force causes the body to move along the target rotational route, and
when the inclination of the travel surface is equal to or greater than the reference inclination and a target end point of the target rotational route is determined based on the tilt information to be located further toward an upward inclination direction of the travel surface compared to a start point of the target rotational route, the driving force causes the body to move such that a virtual end point of a virtual rotational route, along which the body moves when the travel surface is horizontal, is located further toward the upward inclination direction compared to the target end point,
wherein the controller is further configured to:
selectively activate an inclination mode based on the tilt information, and
manage the motor such that the virtual rotational route is different from the target rotational route only when the inclination mode is activated.

12. The moving robot of claim 11, wherein the controller is further configured to manage the motor, when the tilt information indicates a change in the inclination of the travel surface, so as to change a distance in the upward inclination direction between the virtual end point and the start point.

13. The moving robot of claim 12,
wherein the tilt information identifies a tilt value, and
wherein the controller is further configured to control the motor such that the distance in the upward inclination direction between the virtual end point and the start point increases in proportion to the tilt value.

14. The moving robot of claim 11, wherein the controller is further configured to:
activate the inclination mode when the tilt information indicates that an inclination mode condition is satisfied; and
manage the motor to apply the driving force to cause the body to move such that the virtual end point of the virtual rotational route, along which the body moves when the travel surface is horizontal, is located further toward the upward inclination direction compared to the target end point only when the inclination mode is activated.

15. The moving robot of claim 11, wherein the controller is further configured to manage the motor to apply the driving force to cause the body to move such that the virtual end point of the virtual rotational route, along which the body moves when the travel surface is horizontal, is located further toward the upward inclination direction compared to the target end point when the body starts to move along the target rotational route.

16. The moving robot of claim 11, wherein the controller is further configured to:
determine to activate the inclination mode when the tilt information indicates that the inclination for the travel surface exceeds a threshold value for at least a threshold period of time while the body is moving.

17. A moving robot comprising:
a body;
a motor configured to generate a driving force to move the body along a travel surface;
a tilt sensor configured to acquire tilt information about an inclination of the travel surface;
a border signal sensor configured to sense a border signal from an exterior wire; and
a controller configured to manage the motor to selectively perform a direction converting motion such that:
the direction converting motion is started when the border signal indicates that a motion start condition is satisfied while the body is moving, and is terminated when the border signal indicates that a motion termination condition is satisfied;
the direction converting motion includes moving the body along a normal direction converting route when the inclination of the travel surface is less than a reference inclination; and
the direction converting motion includes, when the inclination of the travel surface is equal to or greater than the reference inclination, moving the body such that a virtual direction converting route, along which the body moves when the travel surface is assumed horizontal, becomes different from the normal direction converting route
wherein the controller is further configured to:
selectively activate an inclination mode based on the tilt information, and
manage the motor such that the virtual direction converting route is different from the normal direction converting route only when the inclination mode is activated.

18. The moving robot of claim 17, wherein the virtual direction converting route includes a route having a radius of rotation that increasingly grows.

19. The moving robot of claim 17,
wherein the motion start condition is satisfied when the border signal sensor is within a particular distance of the wire, and
wherein the motion termination condition is satisfied when the border signal sensor, after being moved away from the wire during the direction converting motion, is again positioned within the particular distance of the wire.

20. The moving robot of claim 19,
wherein the border signal sensor is provided at a front of the body, and
wherein a moving direction of the front at a start of the direction converting motion corresponds a direction in which the front moves away from the wire.

* * * * *